US008871016B2

(12) United States Patent
Trexler et al.

(10) Patent No.: US 8,871,016 B2
(45) Date of Patent: Oct. 28, 2014

(54) CELLULOSE-BASED HYDROGELS AND METHODS OF MAKING THEREOF

(75) Inventors: Morgana M. Trexler, Baltimore, MD (US); Jenna L. Graham, Columbia, MD (US); Jennifer L. Breidenich, Atlanta, GA (US); Jeffrey P. Maranchi, Clarksburg, MD (US); Julia B. Patrone, Laurel, MD (US); Marcia W. Patchan, Columbia, MD (US); Jennifer H. Elisseeff, Baltimore, MD (US); Xiomara Calderon-Colon, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 487 days.

(21) Appl. No.: 13/197,116

(22) Filed: Aug. 3, 2011

(65) Prior Publication Data

US 2013/0032059 A1    Feb. 7, 2013

(51) Int. Cl.
*G02C 7/04* (2006.01)
*C08L 33/14* (2006.01)
*C08L 33/20* (2006.01)
*G02B 1/04* (2006.01)
*B29D 11/00* (2006.01)
*C08J 3/075* (2006.01)
*C08B 1/00* (2006.01)
*C08L 1/02* (2006.01)
*C08L 33/26* (2006.01)
*C08L 33/06* (2006.01)

(52) U.S. Cl.
CPC .......... *B29D 11/00038* (2013.01); *G02C 7/049* (2013.01); *C08L 33/20* (2013.01); *G02B 1/043* (2013.01); *C08L 2205/16* (2013.01); *C08J 3/075* (2013.01); *C08L 33/26* (2013.01); *C08L 33/066* (2013.01); *C08B 1/003* (2013.01); *C08L 1/02* (2013.01); *G02B 1/04* (2013.01); *C08J 2301/02* (2013.01)
USPC .............. 106/164.01; 523/106; 523/108

(58) Field of Classification Search
None
See application file for complete search history.

(56) References Cited

U.S. PATENT DOCUMENTS

| | | | |
|---|---|---|---|
| 5,480,427 A | 1/1996 | Kelman et al. | |
| 5,836,313 A | 11/1998 | Perez et al. | |
| 5,846,213 A | 12/1998 | Wan | |
| 5,962,005 A * | 10/1999 | Saga et al. | 424/424 |
| 6,867,245 B2 * | 3/2005 | Iwata et al. | 523/107 |
| 7,195,912 B2 | 3/2007 | Takezawa et al. | |
| 7,476,398 B1 | 1/2009 | Doillon et al. | |
| 7,544,368 B2 | 6/2009 | Hsu et al. | |
| 7,832,857 B2 * | 11/2010 | Levinson et al. | 351/159.33 |

(Continued)

OTHER PUBLICATIONS

Friedlander et al, Effects of soft contacts of differing thickness on corneal wound healing in rabbits, 1989, investigative opthalmology and visual science, vol. 30, No. 10.*

*Primary Examiner* — Melvin C Mayes
*Assistant Examiner* — Stefanie Cohen
(74) *Attorney, Agent, or Firm* — Aisha Ahmad

(57) ABSTRACT

The present invention provides cellulose hydrogels having one or more of the following properties: high water content, high transparency, high permeability, high biocompatibility, high tensile strength and an optimal thickness. The present invention further provides a process for preparing a cellulose hydrogel comprising: (i) contacting cellulose with a solvent to activate the cellulose; (ii) optionally removing the solvent from the activated cellulose; (iii) substantially dissolving the activated cellulose to form a solution; (iv) allowing the solution to gel; and optionally (v) drying the gel and rehydrating the gel. The cellulose hydrogel can have many uses, including uses as contact lenses.

20 Claims, 27 Drawing Sheets

(56) References Cited

U.S. PATENT DOCUMENTS

| | | |
|---|---|---|
| 7,857,447 B2 | 12/2010 | Myung et al. |
| 7,857,849 B2 | 12/2010 | Myung et al. |
| 7,862,831 B2 | 1/2011 | Wang et al. |
| 2004/0142019 A1* | 7/2004 | Serafica et al. ............ 424/445 |
| 2006/0134170 A1 | 6/2006 | Griffith et al. |
| 2006/0246113 A1 | 11/2006 | Griffith et al. |
| 2008/0317818 A1 | 12/2008 | Griffith et al. |
| 2010/0010187 A1 | 1/2010 | Elisseeff |
| 2010/0080840 A1 | 4/2010 | Cho et al. |
| 2010/0198348 A1 | 8/2010 | Hiles et al. |

* cited by examiner

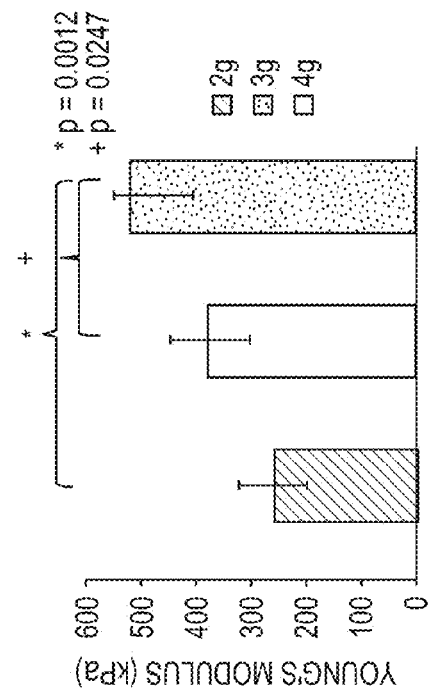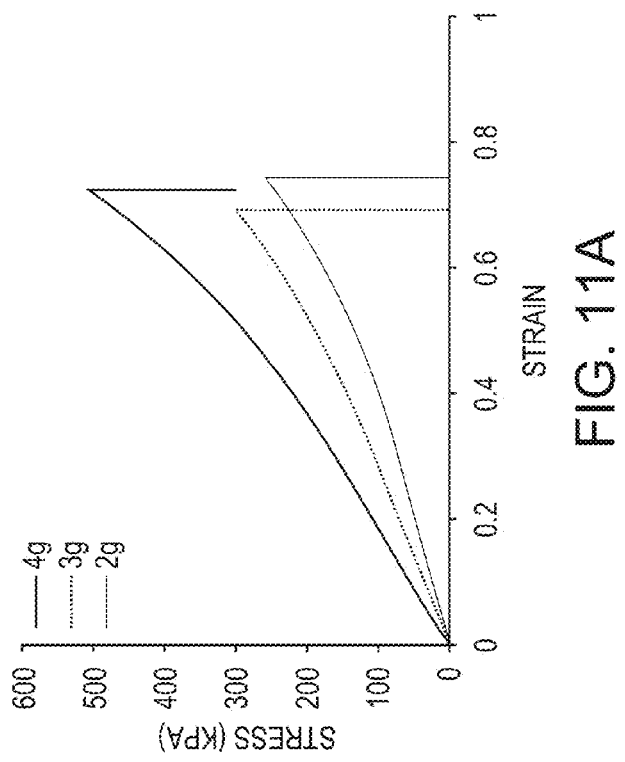

CELLULOSE-BASED HYDROGELS AND METHODS OF MAKING THEREOF

STATEMENT OF GOVERNMENTAL INTEREST

This invention was made with U.S. Government support under contract number X81XWH-09-2-0173. The U.S. Government has certain rights in the invention.

BACKGROUND OF THE INVENTION

1. Field of the Invention

The field of the invention relates to cellulose hydrogels and processes for their production. The field also relates to applications of cellulose hydrogels, for example, as ophthalmic materials, such as soft contact lenses and their production processes.

2. Description of the Related Art

Hydrogels are water-insoluble polymers having the ability to swell in water or aqueous solution without dissolution and to retain a significant portion of water or aqueous solution within their structure. Hydrogels possess a degree of flexibility similar to natural tissue. As such, hydrogels have many uses and applications.

Attempts have been made to improve upon various properties of hydrogels, for example, to increase strength, water content, transparency, permeability or biocompatibility properties, often with mixed results. For example, attempts have been made to optimize certain physical properties of hydrogels, such as strength, to suit various applications. However, such increases in strength often come at the expense of other properties of the hydrogel, such as transparency or water content.

There remains a need for improved hydrogels that have desirable properties, including some or all of high water content, biocompatibility, tensile strength, permeability, and transparency to support a variety of uses, including as ophthalmic materials, such as contact lenses.

This background information is provided for the purpose of making information believed by the applicant to be of possible relevance to the present invention. No admission is necessarily intended, nor should it be construed, that any of the preceding information constitutes prior art against the present invention.

SUMMARY OF THE INVENTION

Accordingly, one aspect of the invention is to provide cellulose hydrogels which possess desirable properties, including one or more of the following properties: high water content, high transparency, high permeability, high biocompatibility, high tensile strength and an optimal thickness.

In another aspect, the invention provides a re-wet cellulose hydrogel wherein the hydrogel has one or more (or all) of the following properties: a cellulose content of from about 40% to about 65% by weight; a tensile strength in the range of from about 1000 kPa to about 5000 kPa; a tear strength of from about 3.0 N/mm to about 12 N/mm; a strain to failure of from about 20% to about 40%; a suture retention strength of from about 1.0 N/mm to about 7.0 N/mm; a transparency that exceeds 85% at 550 nm; Young's modulus of from about 4000 kPa to about 15000 kPa; and a puncture resistance of from about 3 MPa to about 5 MPa. In some embodiments, the invention provides a re-wet cellulose hydrogel comprising cellulose fibers wherein the hydrogel has a tensile strength of at least about 1000 kPa, a cellulose concentration of about 40% to about 65% by weight, and a transparency that exceeds 85% at 550 nm.

In another aspect, the invention provides a wet cellulose hydrogel wherein the hydrogel has one or more (or all) of the following properties: a cellulose content of from about 2% to about 9% by weight; a tensile strength of from about 50 kPa to about 600 kPa; a tear strength of from about 0.10 N/mm to about 0.60 N/mm; a strain to failure of from about 40% to about 80%; a suture retention strength of from about 0.05 N/mm to about 0.30 N/mm; a transparency that exceeds 85% at 550 nm; Young's modulus of from about 100 kPa to about 700 kPa; and a puncture resistance of from about 50 kPa to about 300 kPa.

In some embodiments of the invention, the cellulose hydrogel is used in contact lenses.

In another aspect, the invention provides a process for preparing a cellulose hydrogel comprising: (i) contacting cellulose with a solvent to activate the cellulose; (ii) optionally removing the solvent from (i) leaving the activated cellulose; (iii) substantially dissolving the activated cellulose to form a solution; (iv) allowing the solution of (iii) to gel; and optionally (v) drying the gel and rehydrating the gel. In some embodiments, the solution gels in a mold and is later removed and optionally washed. In some embodiments, the mold is a contact lens mold. In some embodiments, a salt, such as LiCl is added to step (i), and step (ii) is omitted. In some embodiments, step (ii) is performed, and a solvent is added to the activated cellulose to substantially dissolve it.

In some embodiments, the cellulose hydrogel comprises one or more polymers selected from the group consisting of hydroxyethylmethacrylate (HEMA), poly(hydroxyethyl methacrylate) (PHEMA), polyacrylamide, polyethylene glycol (PEG), polyethyleneoxide (PEO), polyacrylonitrile (PAN), polyvinyl alcohol (PVA), poly(vinyl pyrrolidone) (PVP) and silicones.

In some embodiments, the cellulose hydrogel is a composite comprising different celluloses, for example, microcrystalline cellulose and bacterial cellulose.

In another aspect, the invention provides a commercial package comprising one or more cellulose hydrogels, together with instructions for their use. In some embodiments are provided commercial packages and kits, etc., containing contact lenses made in accordance with the present invention.

It is to be understood that both the foregoing general description of the invention and the following detailed description are exemplary, and thus do not restrict the scope of the invention.

BRIEF DESCRIPTION OF THE DRAWINGS

The skilled artisan will understand that the drawings, described below, are for illustration purposes only. The drawings are not intended to limit the scope of the present teachings in any way.

FIGS. 11A-C show tensile properties of wet hydrogels dependent on cellulose concentration.

DETAILED DESCRIPTION

Figure 1:
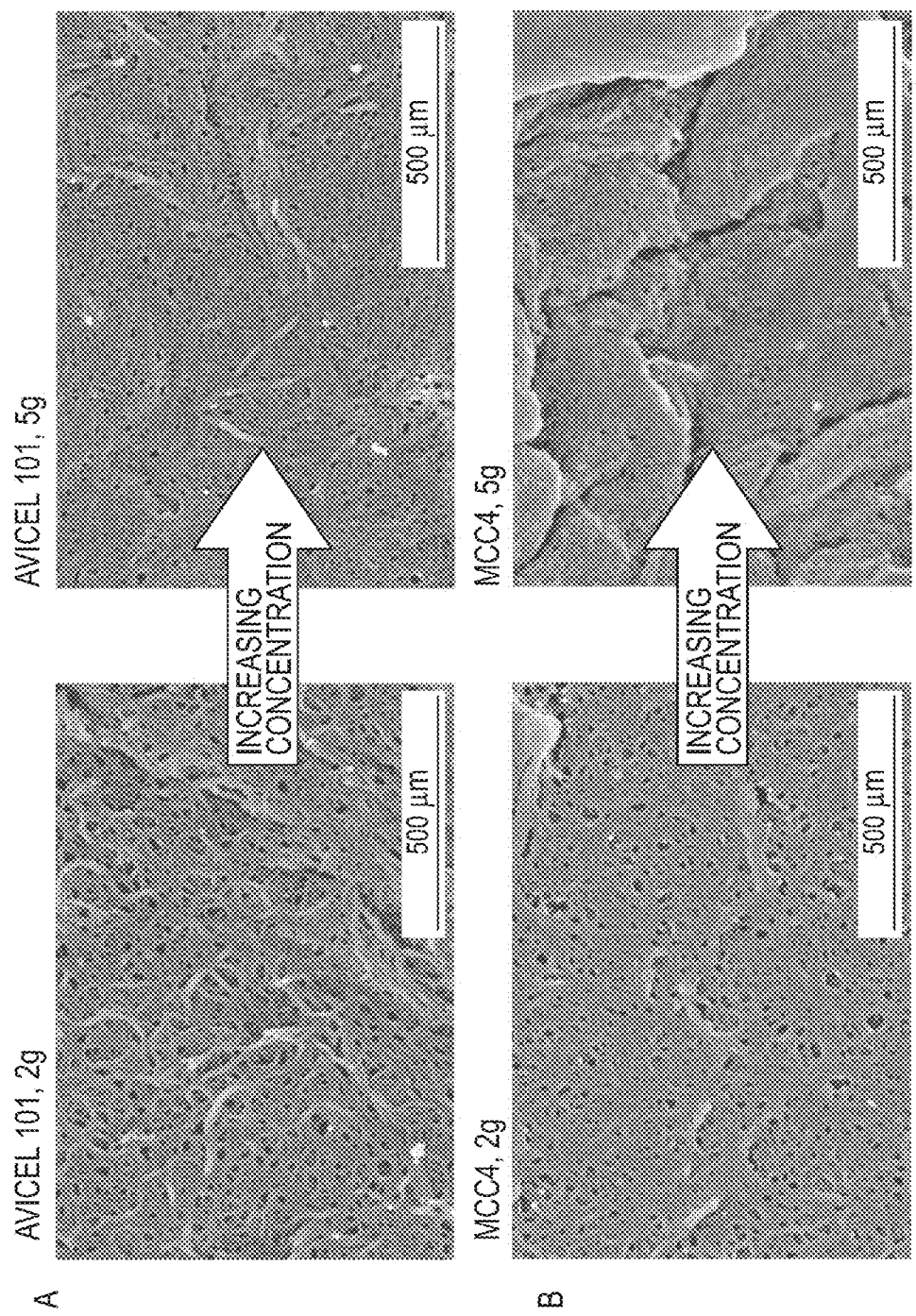
FIGS. 1A-B show cellulose hydrogel microstructure of Avicel 101 and MCC 4 dried by critical point drying following dehydration in methanol.

The present invention relates to a new class of cellulose hydrogels and methods of making thereof and for their use in a wide variety of applications. The present invention is based on the surprising discovery that cellulose hydrogels can be synthesized having some or all of the following desirable properties, including, but not limited to transparency, strength, high water content, permeability and biocompatibility, which make them particularly advantageous and desirable materials for various uses.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of "or" means "and/or" unless stated otherwise. The use of "a" herein means "one or more" unless stated otherwise or where the use of "one or more" is clearly inappropriate. The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

As used herein, the term "cellulose hydrogel" encompasses a polymeric material generally of the formula $(C_6H_{10}O_5)_n$ which exhibits the ability to swell in water or aqueous solution without dissolution and to retain a significant portion of water or aqueous solution within its structure. In some embodiments, the cellulose can be modified. In some embodiments, the cellulose includes modified forms such as cellulose nitrate, acetate or carboxymethylcellulose, methylcellulose, hydroxyethylcellulose, hydroxypropylcellulose, hydroxypropylmethylcellulose and combinations thereof. In some embodiments, the cellulose is modified to create added functional groups.

The term "biocompatible," as used herein, refers to an ability to be incorporated into a biological system, such as into an organ or tissue of an animal, without stimulating an adverse immune or inflammatory response.

As used herein, the term "about" refers to a ±10% variation from the nominal value. It is to be understood that such a variation is always included in any given value provided herein, whether or not it is specifically referred to.

In some embodiments, the present invention relates to improved cellulose-based hydrogels having a combination of desirable characteristics. Such desirable characteristics can include tensile strength, tear strength, suture retention strength, transparency, puncture resistance, oxygen permeability, strain, low cellulose content and high water content, and combinations thereof. In some embodiments of the invention, the cellulose hydrogels are "wet" and in some embodiments, the cellulose hydrogels are "re-wet." As used herein, "wet" cellulose hydrogels are gels that have not been subjected to a dehydration step, whereas "re-wet" cellulose hydrogels have been dehydrated, and subsequently rehydrated. Surprisingly, re-wet cellulose hydrogels exhibit significantly enhanced tensile properties as compared with wet cellulose hydrogels.

The cellulose hydrogels of the invention have multiple uses and applications. For example, the hydrogels are useful in ophthalmic applications, such as contact lenses for vision correction, corneal onlays, corneal inlays, artificial lenses, and artificial corneas, as well as for wound dressing applications.

The cellulose that is used to make the hydrogel can come from any source and can include commercial and non-commercial sources of cellulose. Cellulose is prevalent in plants and some microbes, and thus, in accordance with the invention, cellulose can be used from any plant source or microbial or bacterial source that produces it. In some embodiments, the cellulose that is used is not from a microbial/bacterial source.

In some embodiments, the cellulose can be from a microbial/bacterial source. The cellulose-producing microorganism can be of the genus *Gluconacetobacter, Agrobacterium, Rhizobium, Pseudomonas* or *Alcaligenes*. In some embodiments, the source is from the species *Gluconacetobacter xylinus* or *Gluconacetobacter pasteurianus*. Bacterial cellulose is generally available commercially under the trade names XCELL, BIOFILL, BIOPROCESS and DERMAFILL. Microorganisms or organisms or cells that have been transformed (permanently or transiently) with one or more genes capable or required for manufacturing cellulose and strains or sub-strains related to or derived therefrom can also provide sources of cellulose. In some embodiments, the bacterial cellulose is from a commercial source (for example, from Xylos Corporation, Langhorne, Pa.).

Exemplary plant sources of cellulose include wood pulp, cotton pulp, flax, hemp, jute, and straw, to name a few. In some embodiments, the cellulose is from a source selected from the group consisting of wood pulp, cotton pulp, and combinations thereof. In some embodiments, the source of cellulose is microcrystalline cellulose. Commercial sources of cellulose include those that are sold under the trade name AVICEL, such as AVICEL PH 101, AVICEL PH 102, AVICEL PH 103, AVICEL PH 105, AVICEL PH 112, AVICEL PH 113, AVICEL PH 200, AVICEL PH 301, AVICEL PH 302, and AVICEL PH 200LM. The cellulose hydrogel can be derived from one or more sources of cellulose. In some embodiments, a combination of microcrystalline cellulose from a commercial source is combined with cellulose from a microbial/bacterial source, such as *Gluconacetobacter xylinus*.

In some embodiments, the cellulose (starting material, not gel) has a cellulose density of between about 0.10-0.60 g/cm$^3$. In some embodiments, the cellulose density is between about 0.20-0.40 g/cm$^3$. In some embodiments, the cellulose has a moisture content of between about 2-6%.

In some embodiments the cellulose (starting material, not gel) has a particle size ranging from about 25 µm to about 500 µm, from about 35 µm to about 400 µm, or from about 50 µm to about 250 µm. In some embodiments the particle size is about 25 µm, about 35 µm, about 50 µm, about 60 µm, about 75 µm, about 90 µm, about 100 µm, about 125 µm, about 150 µm, about 175 µm, about 200 µm, about 250 µm, about 300 µm, about 350 µm or about 400 µm.

In some embodiments, the invention provides a re-wet cellulose hydrogel wherein the hydrogel has one or more (or all) of the following properties: a cellulose content of from about 40% to about 65% by weight; a tensile strength in the range of from about 1000 kPa to about 5000 kPa; a tear strength of from about 3.0 N/mm to about 12 N/mm; a strain to failure of from about 20% to about 40%; a suture retention strength of from about 1.0 N/mm to about 7.0 N/mm; a transparency that exceeds 85% at 550 nm; Young's modulus of from about 4000 kPa to about 15000 kPa; and a puncture resistance of from about 3 MPa to about 5 MPa.

In one embodiment, the invention provides a re-wet cellulose hydrogel wherein the hydrogel has a tensile strength of at least about 1000 kPa, a cellulose concentration of about 40% to about 65% by weight, and a transparency that exceeds 85% at 550 nm.

In some embodiments, the invention provides a wet cellulose hydrogel wherein the hydrogel has one or more (or all) of the following properties: a cellulose content of from about 2% to about 9% by weight; a tensile strength in the range of from about 50 kPa to about 600 kPa; a tear strength of from about 0.10 N/mm to about 0.60 N/mm; a strain to failure of from about 40% to about 80%; a suture retention strength of from about 0.05 N/mm to about 0.30 N/mm; a transparency that exceeds 85% at 550 nm; Young's modulus of from about 100 kPa to about 700 kPa; and a puncture resistance of from about 50 kPa to about 300 kPa.

In accordance with the invention, the tensile strength of the cellulose hydrogel can be found by performing a tensile test and recording the force and displacement. These are then converted to stress (using cross sectional area) and strain; the highest point of the stress-strain curve is the "ultimate tensile strength." In some embodiments, tensile strength can be characterized using a 500N capacity tabletop mechanical testing system (#5942R4910, Instron) with a 5N maximum static load cell (#102608, Instron). Pneumatic side action grips can be used to secure the samples (#2712-019, Instron). In some embodiments, a constant extension rate (for example, of about 2 mm/min) until failure can be applied and the tensile strength is calculated from the stress vs. strain data plots.

In some embodiments, the wet cellulose hydrogel has a tensile strength in the range of about 50 kPa to about 600 kPa. In some embodiments, the tensile strength is from about 75 kPa to about 500 kPa, from about 100 kPa to about 400 kPa, from about 150 kPa to about 350 kPa, or from about 200 kPa to about 300 kPa. In some embodiments, the tensile strength is at least about 50 kPa, at least about 75 kPa, at least about 100 kPa, at least about 150 kPa, at least about 200 kPa, at least about 250 kPa, at least about 300 kPa, at least about 350 kPa, at least about 400 kPa, at least about 450 kPa, at least about 500 kPa, at least about 550 kPa or at least about 600 kPa.

In some embodiments, the re-wet cellulose hydrogel has a tensile strength in the range of from about 1000 kPa to about 5000 kPa. In some embodiments, the tensile strength is from about 1250 kPa to about 4500 kPa. In some embodiments, the tensile strength is from about 1500 kPa to about 3500 kPa, from about 1750 kPa to about 3500 kPa, from about 2000 kPa to about 3500 kPa, from about 2000 kPa to about 3000 kPa, from about 2250 kPa to about 2750 kPa, and from about 2250 kPa to about 2500 kPa. In some embodiments, the tensile strength is at least about 1000 kPa, at least about 1100 kPa, at least about 1200 kPa, at least about 1300 kPa, at least about 1400 kPa, at least about 1500 kPa, at least about 1600 kPa, at least about 1700 kPa, at least about 1800 kPa, at least about 1900 kPa, at least about 2000 kPa, at least about 2100 kPa, at least about 2200 kPa, at least about 2300 kPa, at least about 2400 kPa, at least about 2500 kPa, at least about 2600 kPa, at least about 2700 kPa, at least about 2800 kPa, at least about 2900 kPa, at least about 3000 kPa, at least about 3100 kPa, at least about 3200 kPa, at least about 3300 kPa, at least about 3400 kPa, at least about 3500 kPa, at least about 3600 kPa, at least about 3700 kPa, at least about 3800 kPa, at least about 3900 kPa, at least about 4000 kPa, at least about 4100 kPa, at least about 4200 kPa, at least about 4300 kPa, at least about 4400 kPa, at least about 4500 kPa, at least about 4600 kPa, at least about 4700 kPa, at least about 4800 kPa, at least about 4900 kPa or at least about 5000 kPa.

In some embodiments of the invention, the tear strength property of the cellulose hydrogel can be tested using a 500N capacity tabletop mechanical testing system (#5942R4910, Instron) with a 5N maximum static load cell (#102608, Instron). Pneumatic side action grips can be used to secure the samples (#2712-019, Instron). Samples can be tested with a constant extension rate (for example, of about 2 mm/min) until failure. In accordance with the invention, tear strength is calculated as the force at failure divided by the average thickness (N/mm).

In some embodiments, the wet cellulose hydrogel has a tear strength of from about 0.10 N/mm to about 0.60 N/mm. In some embodiments, the tear strength is from about 0.20 N/mm to about 0.40 N/mm, or from about 0.25 N/mm to about 0.35 N/mm. In some embodiments, the tear strength is at least about 0.10 N/mm, at least about 0.15 N/mm, at least about 0.20 N/mm, at least about 0.25 N/mm, at least about 0.30 N/mm, at least about 0.35 N/mm, at least about 0.40 N/mm, at least about 0.45 N/mm, at least about 0.55 N/mm or at least about 0.60 N/mm.

In some embodiments, the re-wet cellulose hydrogel has a tear strength of from about 3.0 N/mm to about 12 N/mm. In some embodiments, the tear strength is from about 5.0 N/mm to about 8.0 N/mm, from about 6.0 N/mm to about 7.5 N/mm, from about 6.3 N/mm to about 7.3 N/mm or from about 6.5 N/mm to about 7.0 N/mm. In some embodiments, the tear strength is at least about 4.0 N/mm, at least about 4.5 N/mm, at least about 5.0 N/mm, at least about 5.5 N/mm, at least about 6.0 N/mm, at least about 6.5 N/mm, at least about 7.0 N/mm, at least about 7.5 N/mm, at least about 8.0 N/mm, at least about 8.5 N/mm or at least about 9.0 N/mm.

In some embodiments, strain to failure ranges from 40-80% for wet cellulose hydrogels. In some embodiments, the strain to failure ranges from about 40% to about 70%, from about 50% to about 70%, or from about 50 to about 60%.

In some embodiments, strain to failure ranges from about 20 to about 40% for re-wet cellulose hydrogels. In some embodiments, the strain to failure ranges from about 20% to about 30%, or from about 25% to about 30%.

In some embodiments of the invention, suture retention strength of cellulose hydrogels can be characterized as a measure of their feasibility for surgical implementation. In some embodiments, suture retention can be important for cellulose hydrogels to secure and maintain their position, for example, during surgery, healing and function. For example, in some embodiments, a surgeon must rely on the ability of the implantable material to not only accept suture without tearing during needle insertion, but also to retain the suture without tearing away from the sutured edge of the implant. To perform suture retention strength studies, cellulose hydrogel samples can be cut from cellulose sheets. For example, samples can be cut to be rectangles 2 cm×4 cm. The samples can be tested using a 500N capacity tabletop mechanical testing system (#5942R4910, Instron) with a 5N maximum static load cell (#102608, Instron). Pneumatic side action grips can be used to secure the samples (#2712-019, Instron). Before testing, the thickness of the sample can be measured at three points along one of the short edges (designated the top edge). The sample can then be secured in the stationary (bottom) pneumatic grip, with half of the sample inside of the grip, and a suture was threaded through the sample once in the center of the sample with a bite size of 2 mm from the top edge. For example, Ethicon Ethilon 10-0 ophthalmic sutures can be used (7756G and 7711G, Ethicon, Inc.). Both ends of the suture can be secured in the movable (top) pneumatic grip.

Figure 22:
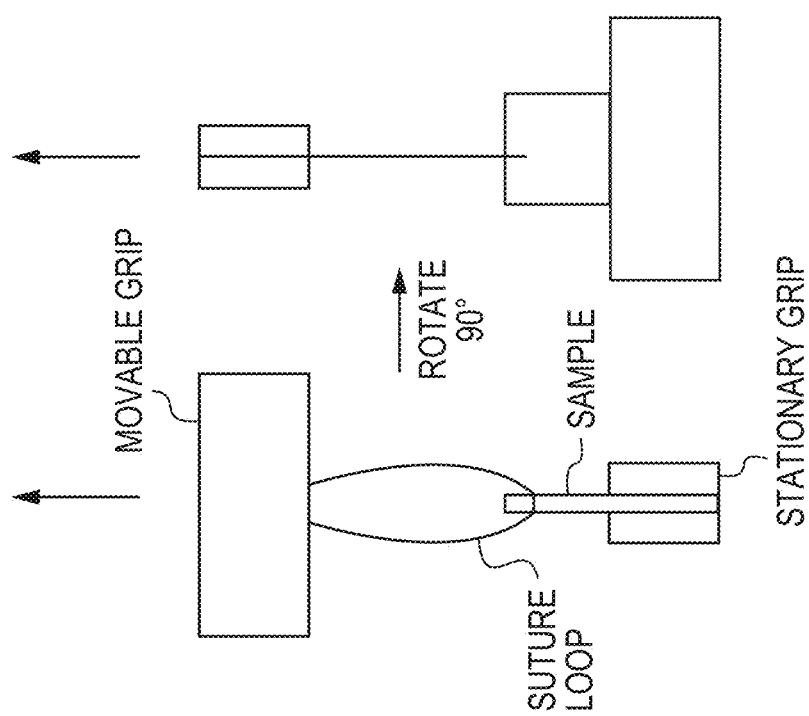
FIG. 22 shows a schematic diagram of sample set up for suture retention strength tests.

See FIG. 22 for a diagram of the sample setup. Samples can be tested with a constant extension rate (for example, of 10 mm/min) until failure. The suture retention strength can be taken to be the force at failure divided by the average sample thickness (N/mm).

In some embodiments, the suture retention strength of wet cellulose hydrogels is from about 0.05 N/mm to about 0.30 N/mm. In some embodiments, the suture retention strength is from about 0.08 N/mm to about 0.23 N/mm, from about 0.1 N/mm to about 0.2 N/mm or from about 0.12 N/mm to about 0.18 N/mm. In some embodiments, the suture retention strength is at least about 0.05 N/mm, at least about 0.10 N/mm, at least about 0.15 N/mm, at least about 0.20 N/mm, at least about 0.25 N/mm, or at least about 0.30 N/mm.

In some embodiments, the suture retention strength of re-wet cellulose hydrogels is from about 1.0 N/mm to about 7.0 N/mm. In some embodiments, the suture retention strength is from about 2.5 N/mm to about 6.0 N/mm, from about 3.0 N/mm to about 5.0 N/mm. In some embodiments, the suture retention strength is at least about 2.0 N/mm, at least about 2.25 N/mm, at least about 2.5 N/mm, at least about 2.75 N/mm, at least about 3.0 N/mm, at least about 3.25 N/mm, at least about 3.5 N/mm, at least about 3.75 N/mm, at least about 4.0 N/mm, at least about 4.25 N/mm, at least about 4.5 N/mm, at least about 4.75 N/mm, at least about 5.0 N/mm, at least about 5.25 N/mm, at least about 5.5 N/mm, at least about 5.75 N/mm, at least about 6.0 N/mm, at least about 6.25 N/mm, at least about 6.5 N/mm, at least about 6.75 N/mm or at least about 7.0 N/mm.

In some embodiments, the transmittance of the cellulose hydrogel can be measured in the range of wavelengths from 250 to 800 nm using, for example, a Perkin-Elmer Lambda 9500 series UV-visible spectrophotometer. In some embodiments, transmittance at 550 nm is measured. As transmittance is dependent upon thickness, the thickness of each sample can be measured with calipers prior to loading in the spectrophotometer. Transmittance values can be normalized to a thickness of 100 μm (or any thickness) according to $$F_{T\text{-}corr}(\lambda, t_2) = [e^{-\sigma_t(\lambda)t_1}]^{\frac{t_2}{t_1}} = [F_{T\text{-}corr}(\lambda, t_1)]^{\frac{t_2}{t_1}},$$

where $t_1$=actual specimen thickness, $t_2$=thickness to which transmittance measurements were normalized.

In some embodiments, the cellulose hydrogels (both wet and re-wet) have transparencies that exceed 85% at 550 nm. In some embodiments, the transparency exceeds 86% at 550 nm, 87% at 550 nm, 88% at 550 nm, 89% at 550 nm, 90% at 550 nm, 91% at 550 nm, 92% at 550 nm, 93% at 550 nm, 94% at 550 nm, 95% at 550 nm, 96% at 550 nm, 97% at 550 nm, 98% at 550 nm or 99% at 550 nm.

In some embodiments, Young's modulus of the cellulose hydrogel can be tested. Young's modulus generally can be determined based on the slope of the stress-strain curve, and is calculated as stress/strain in the linear elastic portion of the curve.

In some embodiments, Young's modulus of the wet cellulose hydrogel is from about 100 kPa to about 700 kPa. In some embodiments, Young's modulus of the wet cellulose hydrogel is from about 150 kPa to about 500 kPa, from about 200 kPa to about 400 kPa or from about 250 kPa to about 350 kPa. In some embodiments, modulus is at least about 100 kPa, at least about 150 kPa, at least about 200 kPa, at least about 250 kPa, at least about 300 kPa, at least about 400 kPa, at least about 450 kPa, at least about 500 kPa, at least about 550 kPa, at least about 600 kPa, at least about 650 kPa or at least about 700 kPa.

In some embodiments, Young's modulus of the re-wet cellulose hydrogel is from about 4000 kPa to about 15000 kPa. In some embodiments, Young's modulus is from about 5000 kPa to about 13000 kPa, from about 6000 kPa to about 12000 kPa, from about 7000 kPa to about 12000 kPa, from about 8000 kPa to about 11000 kPa, or from about 9000 kPa to about 10000 kPa. In some embodiments, modulus is at least about 4000 kPa, at least about 4500 kPa, at least about 5000 kPa, at least about 5500 kPa, at least about 6000 kPa, at least about 6500 kPa, at least about 7000 kPa, at least about 7500 kPa, at least about 8000 kPa, at least about 8500 kPa, at least about 9000 kPa, at least about 9500 kPa, at least about 10000 kPa, at least about 10500 kPa, at least about 11000 kPa, at least about 11500 kPa, at least about 12000 kPa, at least about 12500 kPa, at least about 13000 kPa, at least about 13500 kPa, at least about 14000 kPa, at least about 14500 kPa or at least about 15000 kPa.

Figure 18:
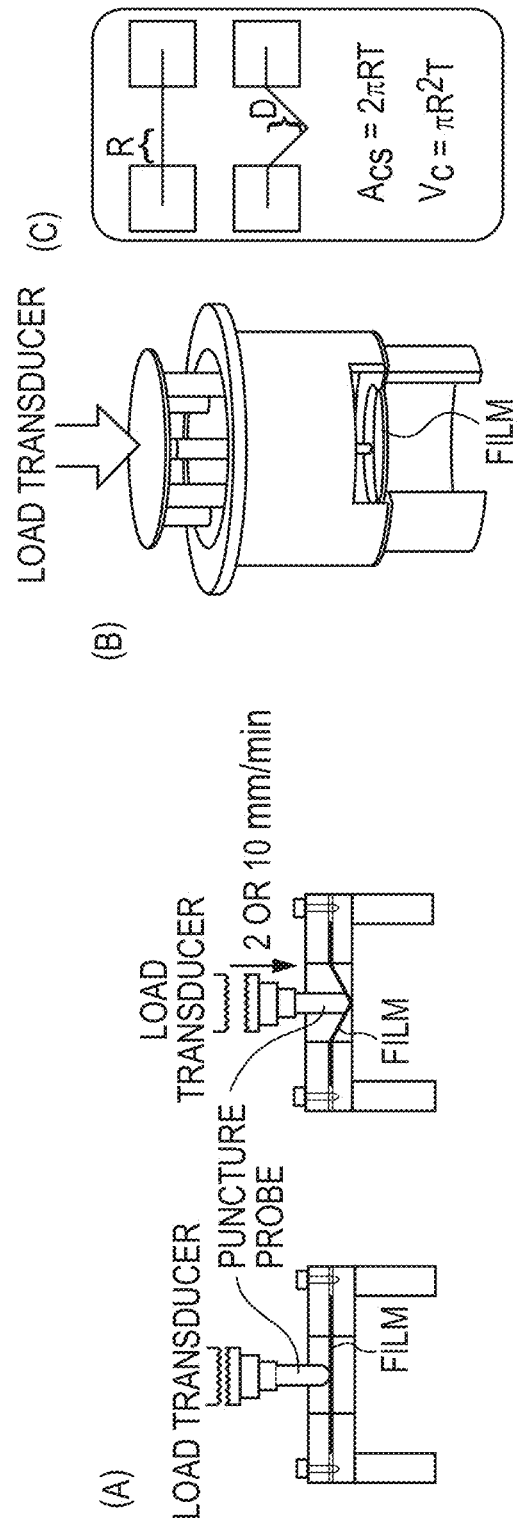
FIG. 18 (A) shows a schematic for testing puncture resistance (B) a puncture test fixture for testing cellulose hydrogels using the setup of (A), and (C) gel dimensions and variables used for calculations. (A) is adapted from Radebaugh et al., *Int J Pharmaceutics* 45, 1988, p 39-46.
Figure 19:
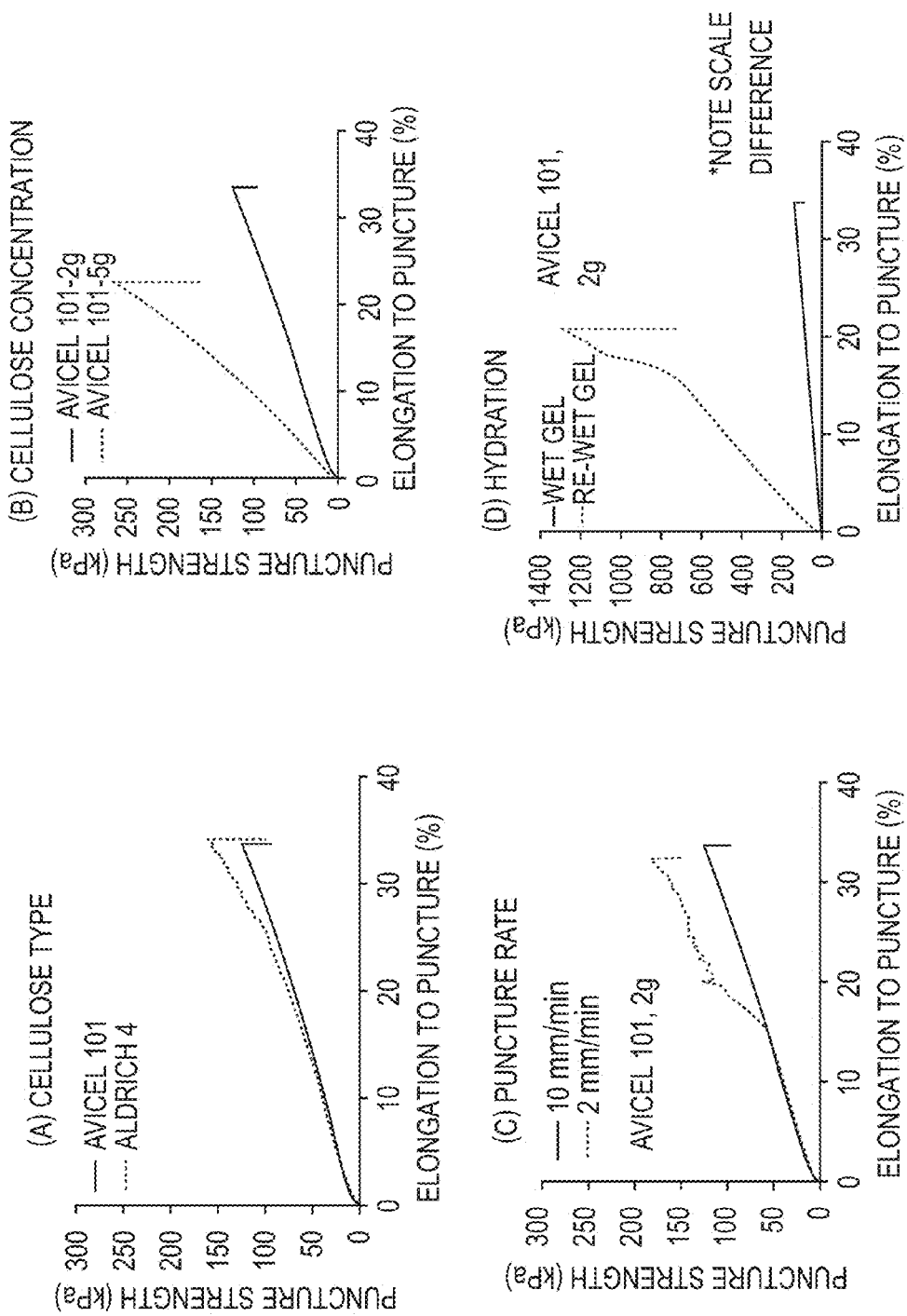
FIGS. 19A-D show a summary of puncture test results for cellulose hydrogels.
Figure 20:
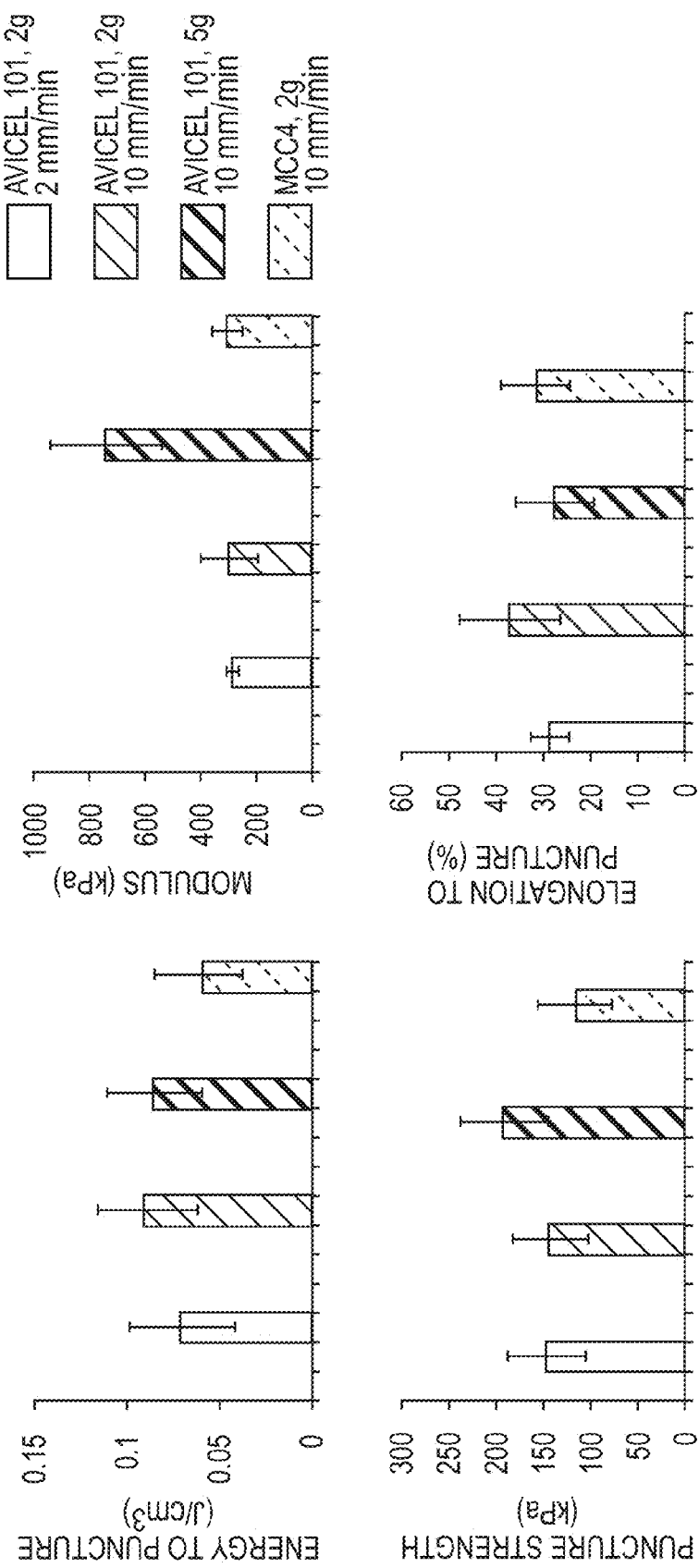
FIG. 20 shows a summary of puncture test results.
Figure 21:
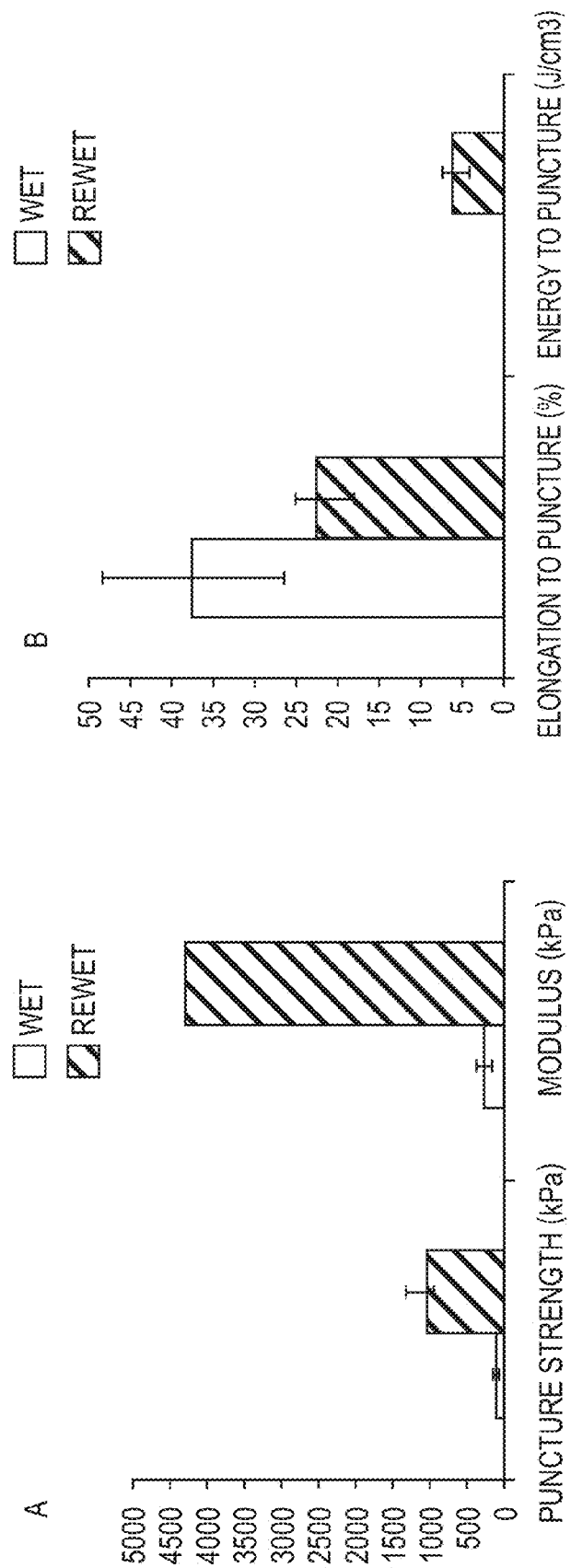
FIGS. 21A-B show puncture stiffness results for wet and re-wet Avicel 101 (2 grams of cellulose in 100 ml of solvent) hydrogels.

In some embodiments, puncture resistance can be characterized according to a slightly modified version of the method described by Radebaugh et al. (Radebaugh et al., *Int J Pharmaceutics* 45, 1988, p 39-46). A schematic of this setup can be seen in FIG. 18A and the fixture designed for this work is shown in FIG. 18B. Rather than fixing the hydrogel between two plates using screws, which can pinch or tear the gel, the hydrogels can be secured to the fixture with cyanoacrylate. In some embodiments, a hemispherical probe with a 2 mm diameter is lowered onto the gel at a rate of 2 or 10 mm/min. Elongation to puncture can be measured as $$\varepsilon_p(\%) = \frac{([R]^2 + [D]^2)^{1/2} - R}{R} \cdot 100,$$

puncture strength can be calculated as $$\sigma_{puncture}(\text{kPa}) = \frac{F}{A_{cs}},$$

and energy to puncture can be calculated as $$\Delta E_p(\text{J/cm}^3) = \frac{\int F \cdot D}{V_c},$$

where F=force and all other variables are defined in FIG. 18C.

In some embodiments, puncture resistance of the wet cellulose hydrogel is from about 50 kPa to about 300 kPa. In some embodiments, puncture resistance is from about 75 kPa to about 300 kPa. In some embodiments, puncture resistance is from about 100 kPa to about 250 kPa. In some embodiments, puncture resistance is from about 125 kPa to about 200 kPa. In some embodiments, puncture resistance is at least about 50 kPa, at least about 100 kPa, at least about 150 kPa, at least about 200 kPa, or at least about 300 kPa.

In some embodiments, puncture resistance of the re-wet cellulose hydrogel is from about 3 MPa to about 5 MPa. In some embodiments, puncture resistance is from about 3.5 MPa to about 5 MPa. In some embodiments, puncture resistance is from about 3.5 MPa to about 4.5 MPa. In some embodiments, puncture resistance is from about 4 MPa to about 4.5 MPa. In some embodiments, puncture resistance is at least about 3 MPa, at least about 3.5 MPa, at least about 4.0 MPa, at least about 4.5 MPa, or at least about 5.0 MPa.

In some embodiments, oxygen permeability of the cellulose hydrogel can be tested using a polarographic method. This method directly measures the number of oxygen molecules diffusing though the material by measuring an electric current generated by the reduction of oxygen at the cathode. In a single polarographic determination, four samples of the same material with different thicknesses can be used. This results in a linear relation between the inverse of oxygen transmissibility and the sample thickness. The sample can be placed onto the surface of the electrode (cell), fixed gently by pressing toward the electrode and retained with an o-ring. Then, a saline solution (e.g., 0.9% NaCl, pH 7.4) is poured into the reservoir on the material, and the system is ready for the measurement of the electric current. The system is held in a humidity chamber at 35° C. with high humidity (the polarographic cell and the saline solution were in the humidity chamber prior the measurement to achieve equilibrium conditions). The saline solution and the sample are saturated with atmospheric oxygen. To remove it, nitrogen gas is bubbled through a glass frit while monitoring current, until the current decreases to nearly zero. Once most of the oxygen is removed, air is bubbled into the solution, and the increase in electric current is observed as the oxygen molecules react with the cathode. The current is recorded until it reaches a stationary state.

In some embodiments, the cellulose content of the wet cellulose hydrogel is about 2% to about 9% by weight. In some embodiments, the cellulose content of the wet hydrogel is about 3% to about 8% by weight, about 4% to about 7% by weight, or about 5% to about 6% by weight. In some embodiments, the cellulose content of the wet hydrogel is about 2% by weight, about 2.5% by weight, about 3.0% by weight, about 3.5% by weight, about 4.0% by weight, about 4.5% by weight, about 5.0% by weight, about 5.5% by weight, about 6.0% by weight, about 6.5% by weight, about 7.0% by weight, about 7.5% by weight, about 8.0% by weight, about 8.5% by weight or about 9.0% by weight.

In some embodiments, the cellulose content of the re-wet cellulose hydrogel is about 40% to about 65% by weight. In some embodiments, the cellulose content of the re-wet hydrogel is about 40% to about 55% by weight, or about 45% to about 55% by weight. In some embodiments, the cellulose content of the re-wet hydrogel is about 40% by weight, about 45% by weight, about 50% by weight, about 55% by weight, about 60% by weight or about 65% by weight.

The water content and thus the cellulose content of the cellulose hydrogel can be determined by thermal gravimetric analysis. For example, samples can be heated from room temperature to about 400° C. and their masses are measured during the heating. The mass lost during the temperature increase reflects the water content and the remainder, the cellulose content.

In some embodiments, the cellulose hydrogel has a thickness of about 10 µm to about 2500 µm. In some embodiments, the thickness is about 50 to about 1000 µm. In some embodiments, the thickness is from about 75 µm to about 500 µm. In some embodiments, the thickness is about 35 µm, about 60 µm, about 85 µm, about 100 µm, about 125 µm, about 175 µm, or about 225 µm. Different thicknesses can be produced, depending on the intended use.

In some embodiments, the cellulose hydrogel can be provided in the desired thickness using a single layer of the hydrogel material, or using multiple layers of the hydrogel material. In some embodiments, the cellulose hydrogel comprises a plurality of layers or plys. For example, a plurality of (i.e. two or more) layers of cellulose hydrogel material, can be bonded together to form a multilaminate structure. In some embodiments, two, three, four, five, six, seven, eight, nine, ten, or more cellulose hydrogel layers are bonded together to provide a multilaminate material. The layers of cellulose hydrogel can be bonded together in any suitable fashion, including dehydrothermal bonding under heated, non-heated or cooled (e.g. lyophilization) conditions, vacuum pressing, using adhesives, glues or other bonding agents, crosslinking with chemical agents or radiation (including UV radiation), or any combination of these with each other or other suitable methods. In some embodiments, the hydrogel of the invention comprises one or more cellulose layers. In one embodiment, the cellulose fibers in a layer are substantially aligned relative to the other cellulose fibers in the same layer. In other embodiments including multiple layers of cellulose fibers, the fibers in each layer are aligned and rotated relative to the fibers in an adjacent layer. In certain embodiments, a cellulose fiber layer is rotated between about 5-90 degrees relative to an adjacent layer. In some embodiments, the cellulose fibers are substantially aligned relative to the other cellulose fibers in the same layer. In some embodiments, the fibers can be aligned by a process selected from the group consisting of wet drawing (stretching wet gels to cause alignment of fibers), syringe pump synthesis (ejecting fibers through an array of syringes forming the gel from these aligned fibers), subjecting the fibers to electric or magnetic fields (fields interact with charged particles on the cellulose), and a combination thereof. In some embodiments, the hydrogel comprises multiple layers of cellulose fibers, wherein the fibers in each layer are rotated relative to the fibers in an adjacent layer.

In some embodiments, the cellulose hydrogel can be a composite comprising cellulose from one or more sources, which can be in the same layer or in different layers. In some embodiments, the cellulose hydrogel is a composite of microcrystalline cellulose from a plant source and bacterial cellulose. In some embodiments, the cellulose hydrogel comprises one or more cellulose fiber layers and one or more layers of a modified cellulose polymer. In some embodiments, the cellulose hydrogel comprises one or more cellulose fiber layers and one or more layers of synthetic polymer. In some embodiments, the cellulose hydrogel comprises one or more layers of cellulose of bacterial origin and one or more layers of cellulose of plant origin.

In some embodiments, the cellulose hydrogel is a composite comprising cellulose and one or more synthetic polymers. In some embodiments, the one or more synthetic polymers are selected from the group consisting of hydroxyethylmethacrylate (HEMA), poly(hydroxyethyl methacrylate) (PHEMA), polyacrylamide, polyethylene glycol (PEG), polyethyleneoxide (PEO), polyacrylonitrile (PAN), polyvinyl alcohol (PVA), poly(vinyl pyrrolidone) (PVP), and silicones.

The synthetic or natural polymer can be added to the cellulose before, during or after the cellulose forms a gel. In some embodiments, the synthetic polymer forms a gel and is added to the cellulose hydrogel in a layered fashion. In some embodiments, the cellulose hydrogel comprises alternating layers of cellulose and one or more synthetic polymers. In some embodiments, the synthetic or natural polymer is layered on top of the cellulose hydrogel.

In some embodiments, the cellulose hydrogel is prepared by a process comprising:

(i) contacting cellulose with a solvent to activate the cellulose;

(ii) optionally removing the solvent from the activated cellulose;

(iii) substantially dissolving the activated cellulose to form a solution; and (iv) allowing the solution to gel.

In some embodiments, the process further comprises: (v) drying the gel and rehydrating the gel, to create a re-wet cellulose hydrogel. In some embodiments, a salt, such as LiCl, is added to step (i) directly, and step (ii) is omitted. In some embodiments, step (ii) is performed, and a solvent is added to the activated cellulose to substantially dissolve it. In some embodiments, the solvent includes a salt, such as LiCl.

In some embodiments, the cellulose content of the solution of (iv) is from about 1.0% to about 6.5% weight/volume (wt/vol). In some embodiments, the cellulose content is from about 1.5% to about 6.0% wt/vol, from about 2.0% to about 5.0% wt/vol, or from about 2.5% to about 3.0% wt/vol. In some embodiments, the cellulose content is about 1.5% wt/vol, about 2.0% wt/vol, about 2.5% wt/vol, about 3.0% wt/vol, about 3.5% wt/vol, about 4.0% wt/vol, about 4.5% wt/vol, about 5.0% wt/vol, about 5.5% wt/vol, about 6.0% wt/vol, or about 6.5% wt/vol.

In some embodiments, the solution gels in a mold or on a flat glass plate and is later removed from the mold and is optionally washed. In some embodiments, the gel is washed for several hours in running water to remove all salts/solvents. In one embodiment, the mold is a contact lens mold.

In some embodiments, the solvent of step (i) is selected from the group consisting of dimethylacetamide, water, methanol, acetone, ethanol and a combination of water and ethanol.

Any suitable technique can be used for removing the solvent of step (i), if desired, including decanting the solvent from the reaction mixture.

The activated cellulose can be substantially dissolved in any solvent suitable for such dissolution. In some embodiments, the solvent for dissolving the cellulose is selected from the group consisting of cupriethylenediamine (CED), cadmiumethylenediamine (Cadoxen), LiCl/dimethylacetamide (LiCl/DMAc), $Ca(SCN)_2$/water, 1-butyl-3-methylimidazolium chloride (BmimCl), NaOH/water, N-methyl-morpholine-N-oxide (NMMO)/water, and 1-allyl-3-methyllimidazolium chloride. As indicated above, in some embodiments, a salt, such as LiCl, is added to step (i) directly. The addition of the salt to step (i) can result in the activated cellulose becoming substantially dissolved in the solvent.

In some embodiments, the solution of activated cellulose is allowed to gel overnight, but other suitable gelling times also may be used. In some embodiments, the wet hydrogel is gelled in a mold or on a flat plate. In some embodiments, the wet hydrogel solution or mixture obtained from the step of substantially dissolving the activated cellulose in a solvent can be transferred directly to the mold or flat plate, for example, for gelling without additional treatment steps, or at least chemical treatment steps.

Any suitable technique for drying the gel can be used. In some embodiments, the gel is dried by: 1) freeze drying (lyophilization); 2) drying in a hot press between two heated platens while applying an amount of pressure; 3) a solvent exchange process 4) supercritical $CO_2$; 5) air drying; and 6) a combination of the above techniques.

In one embodiment, the gel can be dried in a hot press between two heated platens, preferably lined with Teflon film, while applying a small amount of pressure. In some embodiments, the drying temperature can be in the range of about 25-90° C., and the drying time varies based on the hydrogel's thickness. In some embodiments, sheets of cellulose hydrogel are dried or dehydrated between glass plates lined with Teflon film in an oven above 100° C. for several hours, preferably about 5 hours.

In some embodiments, the gel is dried by a solvent exchange followed by supercritical $CO_2$. When drying the gel by a solvent exchange process followed by supercritical $CO_2$, in one embodiment, gels are immersed in a solvent, for example, methanol, and placed under a vacuum in a chamber. The gel then undergoes a purge cycle and the methanol is replaced by liquid $CO_2$. Solvents other than methanol can also be used, including acetone.

Any suitable technique or conditions for rehydrating the gel may be used, including, in some embodiments, rehydrating the gel in tap or deionized water for several hours. In some embodiments, the gel is rehydrated in a substantially sterile aqueous solution, such as saline, or buffered saline. In some embodiments, the gel is rehydrated in biological growth medium such as DMEM.

The cellulose hydrogels of the invention can be provided and packaged in a dehydrated or hydrated state. Dehydration of the cellulose hydrogel can be achieved by any means known in the art. For example, dehydration can be accomplished by lyophilization, including, for instance, freeze-drying or evaporative cooling techniques, air-drying, heating, or the like. When desired, a suitable aqueous medium can be used to rehydrate a dehydrated material of the invention prior to use. In some embodiments, the aqueous medium can be pure water or a physiologically acceptable solution such as phosphate-buffered saline (PBS).

In some embodiments, the packaging material is impermeable to water to prevent the cellulose hydrogel membrane from drying out, and be able to withstand a sterilization process, if desired.

In some embodiments, the cellulose hydrogel membrane is sterilized before or after packaging. Such sterilization procedures can include, for example, gamma irradiation and electron beam sterilization or autoclave.

The cellulose hydrogels of the invention have many uses, including, for example, as contact lenses, wound dressings, including transparent bandages, ocular bandages, corneal onlays, corneal inlays, and for corneal replacement, including partial or full-thickness corneal implants. Other uses of the cellulose hydrogels include, without limitation, wound healing applications, tissue regenerative applications, cardiovascular applications, orthopedic applications, and urologic applications. Still other applications of the cellulose hydrogels of the invention include drug delivery systems, including sustained-release delivery systems, osmotic membranes (for drug delivery or other uses), chemical or biological sensor membranes, transparent structural material, diapers or sanitary napkins due to their absorbent properties, breast or other cosmetic implants, as well as other medical devices in which the cellulose hydrogels of the invention would be suitable.

In some embodiments, the cellulose hydrogel is used as a soft contact lens for vision correction. In some embodiments, the cellulose hydrogel membrane has a refractive index of between about 1.3 and about 1.5. In some embodiments, the refractive index is about 1.30, 1.31, 1.32, 1.33, 1.34, 1.35, 1.36, 1.37, 1.38, 1.39, or 1.40.

The cellulose hydrogel for use as a contact lens can be produced using various molds, as is known in the art. Examples of such molds and their methods of production may be found in U.S. Pat. Nos. 4,565,348, 4,640,489, 4,495,313, and 7,833,443, which are incorporated herein by reference in their entirety.

In some embodiments, methods for making a contact lens comprising the cellulose hydrogel of the invention involve placing a sheet of the hydrogel over a cavity of a first half of a lens mold in the presence of a suitable buffer, for example, PBS. Force can then applied, by a spring clamp, for example, to keep the first half together with the second half of the mold. The mold can then be placed in a humidity chamber having a suitable relative humidity and temperature. In some embodiments, the relative humidity is from about 35% to about 55% (for example 40%), while the temperature is from about 30° C. to about 50° C. (for example, about 40° C.). After a sufficient period of time, about 48 hours in one embodiment, the clamp or other force applied can be removed and the mold opened. Any excess cellulose and gel can then be trimmed, as desired. The lens can then be stored in a suitable buffer, including, for example, PBS. In particular, one method for making a cellulose hydrogel contact lens in accordance with the invention is described in Example 5 and illustrated in FIG. 24.

In some embodiments, after the contact lens is removed from the mold it may undergo additional processing steps such as trimming, edge chamfering, cleaning, sterilization, hydration, polishing, coating with an antireflective coating, and packaging for shipment. In some embodiments, the contact lens will be coated or imbibed with an adjuvant, for example a neutral alkane mineral oil, such as DRAKEOL-20 or SOOTHE, which augments and fortifies the oil layer of the tear film by reducing evaporation of the aqueous component of the tear film while lubricating the action of the eye lids.

In some embodiments, the contact lens cellulose hydrogel has a refractive index of about 1.34, a base curve radius of from about 7.9 to about 8.4 mm, a center thickness of between about 65 and 110 microns, and a spherical front radius of from about 8.6 to 9.0 mm.

In some embodiments, the present invention also provides kits and packaging and solutions comprising the cellulose hydrogel contact lens of the invention, and optionally instructions for their use, as described further below.

In some embodiments, the cellulose hydrogel contact lenses are packaged in blister packages or glass vials. In some embodiments, the cellulose hydrogel membranes are stored in saline or deionized water in the packages. In some embodiments, the cellulose hydrogel contact lenses may tend to stick to itself and to the package. Therefore, in some embodiments, the packaging solutions for blister-packs are formulated to reduce or eliminate folding and sticking. In some embodiments, the packaging solutions may include a polymer to improve comfort of the cellulose hydrogel membrane. In some embodiments, polyvinyl alcohol (PVA) is added to packaging solution. The packaging solution can include polyethylene oxide (PEO)/polypropylene oxide (PPO) block copolymers, such as poloxamers or poloxamines, as disclosed in U.S. Pat. No. 7,832,856.

In some embodiments, the contact lenses are packaged in a blister pack. Examples of typical art blister packs are shown in U.S. Pat. Nos. 5,704,468, 4,392,569, 5,620,088, 5,620,088, 4,691,820, 5,823,327, 5,853,085, and EP Publication Nos. 1092645 A1, 1092645, and 0129388, which are incorporated by reference herein in their entirety. In some embodiments, the lenses are packaged in a blister pack polypropylene receptacle (herein after referred to as a "boat"), topped by a multi-layer film consisting of polyethylene, aluminum, a bonding agent and polypropylene. In some embodiments, the boat is an injection molded plastic which has high stiffness but is capable of limited elastic deflection and includes a preformed recess. The boat is filled with a suitable storage solution, such as saline, and receives a single lens in situ. In some embodiments, blister pack is autoclaved using steam and pressure to terminal sterility. These blister packs can be presented to the subject or health care provider in boxes of individual packs or as multiple blister strips. In some embodiments, the lenses are kept hydrated while in the package. Preferably, the package is well sealed and should minimize water vapor transmission through the boat and laminated layer to maximize the shelf life and prevent drying out of the contact lenses contained therein. In use, the user removes the laminated material from a flange formed on the boat by peeling back the cover to expose the cellulose hydrogel membranes immersed in a hydrating solution.

In at least some embodiments, the contact lenses will be corrective of vision and can be single vision, bifocal, trifocal, and progressive. In some embodiments, the peripheral edges to the lenses will be chamfered or beveled to round the peripheral edges so as to prevent snagging onto the eyelid wiper during blinking Additionally, in other embodiments of the present invention, the cellulose hydrogel can be configured or used for other treatments of the eye of a subject. In some embodiments, the hydrogel can be used to repair or replace the cornea and/or conjunctiva tissue of the eye. For example, the biocompatible material may be implanted in the treatment of corneal epithelial defects such as corneal ulcers (breaks in the outer layer of the epithelium of the cornea) and/or for ocular surface reconstruction.

The cellulose hydrogels of the invention also can be useful for replacing all or a portion of the cornea of an eye. In some embodiments, at least a portion of a damaged or diseased cornea of a subject is removed, and the cellulose hydrogel of the invention is implanted in its place. The implant can be attached to the eye in any suitable fashion. In some embodiments, the implant is attached using sutures. In some embodiments, the subject is a human or other mammal. Corneal implants incorporating a cellulose hydrogel of the present invention may be provided in a shape corresponding to all or a portion of a native cornea. The implant can be provided as single-layer or multiple-layer of cellulose hydrogel material to provide the desired thickness.

In some embodiments, the hydrogel can be used as a corneal onlay. As used herein, a "corneal onlay" is an ophthalmic implant or device configured for placement between the epithelium or an epithelial cell layer and Bowman's membrane of an eye. In comparison, a contact lens is configured for placement over the epithelium of an eye. A corneal onlay may thus be located after placement entirely over the Bowman's membrane, or may include one or more portions extending into the Bowman's membrane. Such portions preferably constitute a minor portion of the device, for example, less than 50% of the area or volume of the device.

In some embodiments, the hydrogel can be used as a corneal inlay. As used herein, a "corneal inlay" is a device or implant configured to be placed in the stroma of an eye. Corneal inlays may be placed in the stroma by forming a flap or a pocket in the stroma. Corneal inlays are placed below the Bowman's membrane of an eye.

Medical implants incorporating the cellulose hydrogel of the invention can be provided in a variety of shapes, including planar (e.g. sheet-form) and non-planar shapes. Exemplary non-planar shape implants include implants configured to have a concave surface, e.g., to substantially correspond to a convex surface of eye tissue against which the implant will reside. Thus, certain implants of the invention will have a convexo-concave structure in their relaxed state, for example in the case of a parabolic shape or a segment of a sphere (e.g. hemisphere). Such an implant may in some cases serve as a lens.

Application of the teachings of the present invention to a specific problem is within the capabilities of one having ordinary skill in the art in light of the teaching contained herein. Examples of the compositions and methods of the invention appear in the following non-limiting Examples.

EXAMPLES

Example 1

Cellulose Gel Synthesis

Seven different types of cellulose were evaluated to determine suitable material for synthesis of a cellulose hydrogel.

TABLE 1

| Cellulose Type | Avicel PH 101 | Avicel PH 102 | Avicel PH 105 | Avicel PH 200 | Aldrich Product #310697 | Aldrich Product #435236 | Bacterial Cellulose (Xylos) |
|---|---|---|---|---|---|---|---|
| Origin | Plant fiber | Plant fiber | Plant fiber | Plant fiber | Cotton Linters | Cotton Linters | *Acetobacter xylinum* |
| Particle size (microns) | 50 | 90 | 20 | 180 | 20 | ~100 | 20 nm × 50 nm × 100 µm |
| Density (g/cm$^3$) | 0.26-0.31 | 0.28-0.33 | 0.20-0.30 | 0.29-0.36 | 0.5 | 0.6 | 1.6 |
| Moisture Content (%) | 3-5 | 3-5 | <5 | 2-5 | | | |

The cellulose hydrogel was synthesized by activating 2-5 grams of cellulose powder in 100 ml N,N-dimethylacetamide (DMAc), and stirring (for example, at 350 rpm) for 24 hours. In a separate beaker, 8 grams of LiCl was dissolved in 100 ml DMAc, and stirred at 350 rpm. The DMAc was decanted from the activated cellulose powder and the LiCl/DMAc solution was poured onto the cellulose, and stirred for 10 minutes. The resulting transparent solutions were poured into desired molds and allowed to "gel" overnight. The gels were demolded and washed in running water for several hours.

Figure 2:
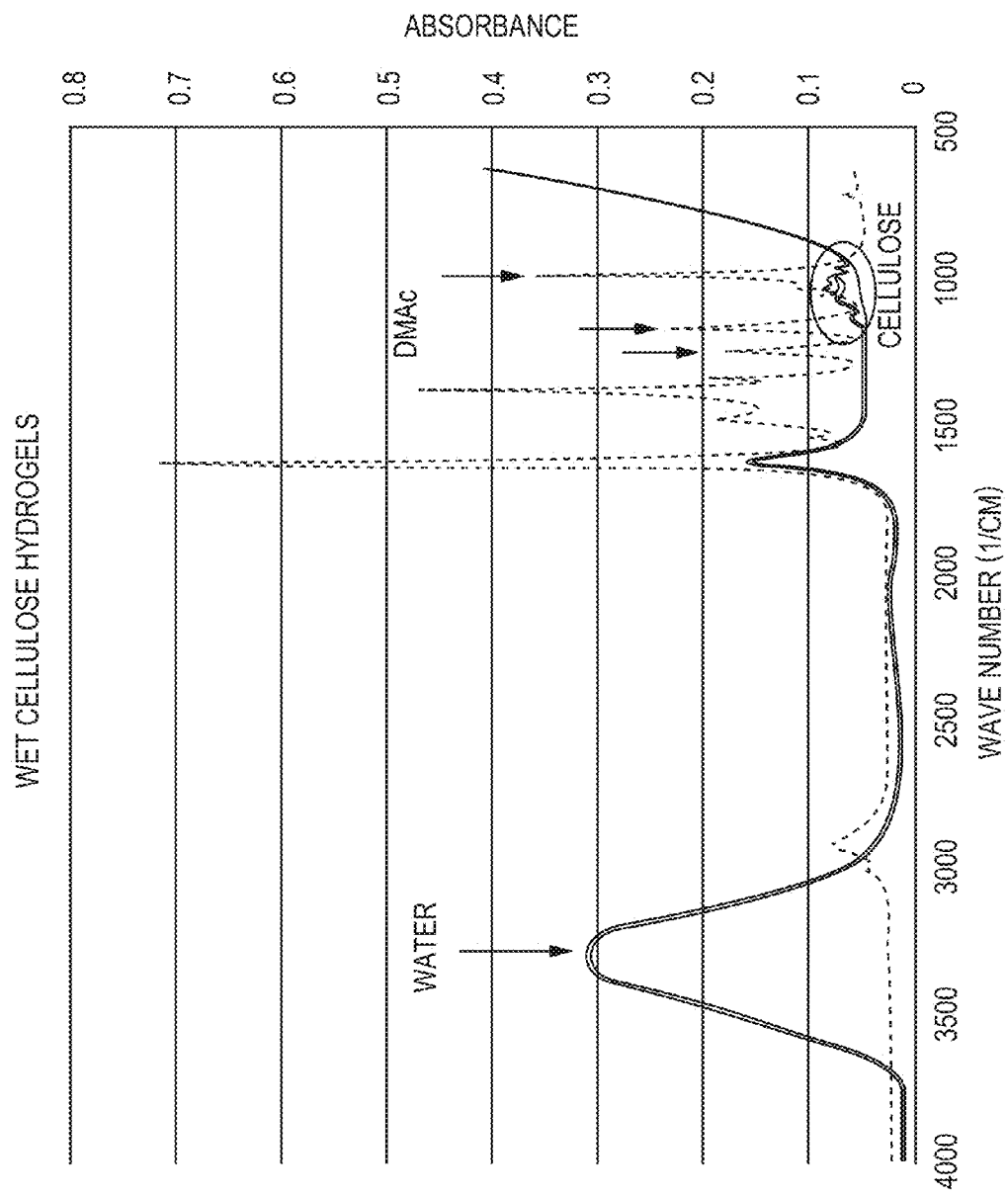
FIG. 2 shows Fourier Transform Infrared Spectroscopy (FTIR) of wet cellulose hydrogels.
Figure 4:
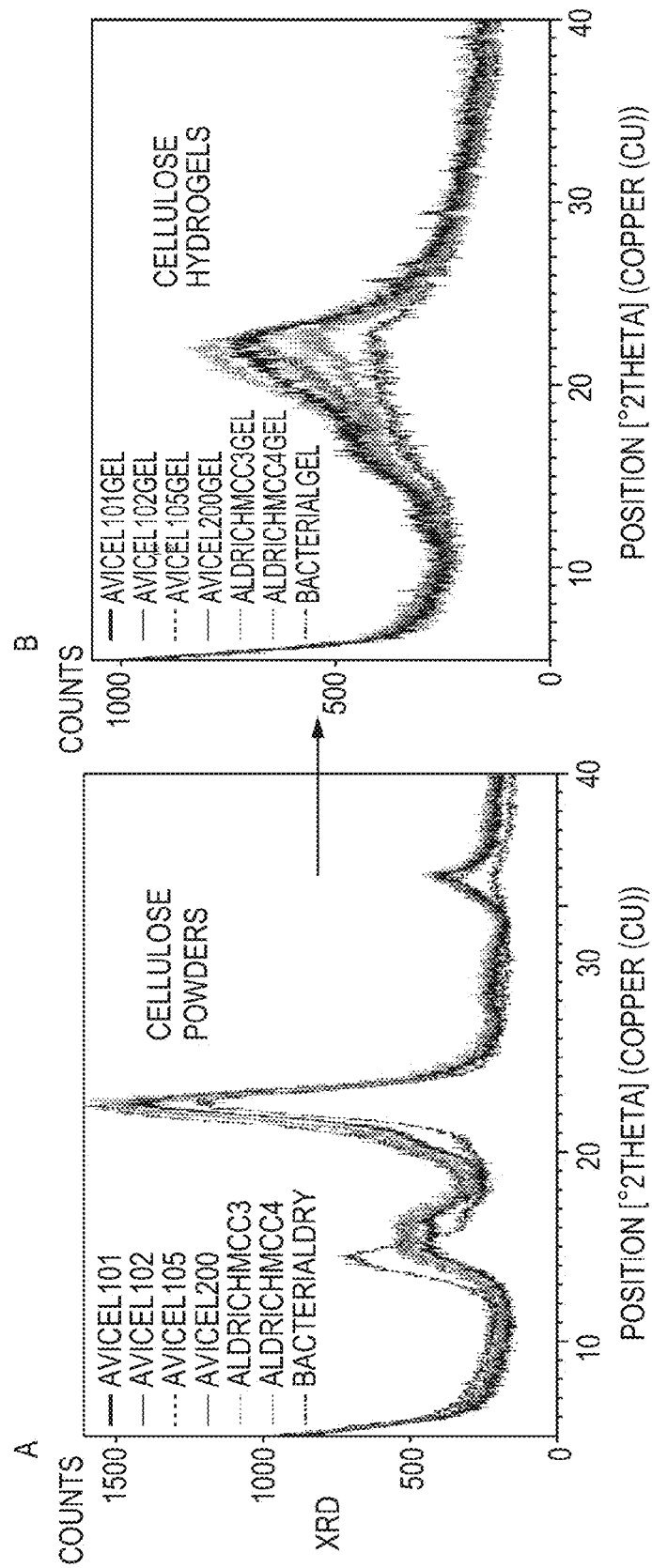
FIGS. 4A-B show X-ray diffraction of various cellulose powders and cellulose hydrogels.

The hydrogels were subjected to various analyses, including Fourier Transform Infrared Spectroscopy (FTIR), X-ray diffraction (XRD) and thermogravimetric analysis (TGA) to determine 1) whether there were any chemical differences between different varieties of cellulose, 2) how different phases of cellulose compare (raw powder, wet hydrogel, dry gel, re-wet gel) and 3) whether the gels were washed successfully. As shown in FIGS. 2 and 4, there were no significant chemical differences between the varieties of cellulose and the washing procedure was successful.

Figure 5:
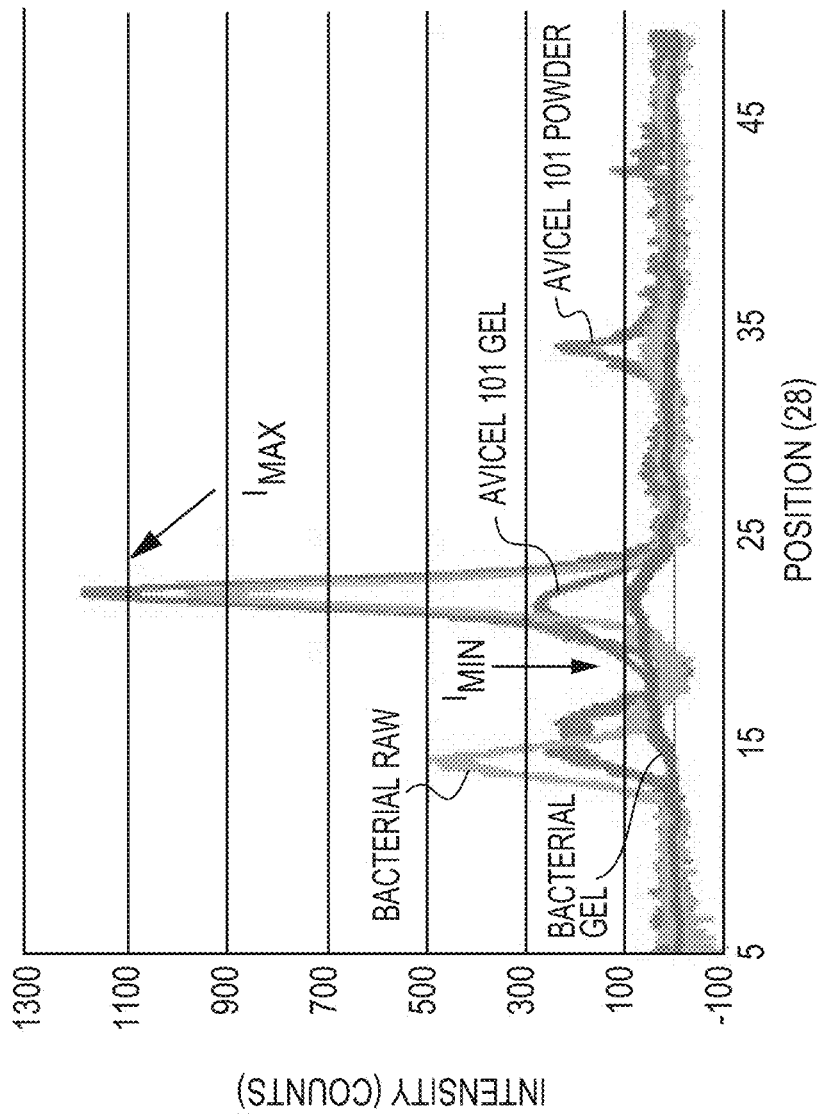
FIG. 5 shows X-ray diffraction analysis of cellulose raw powder and hydrogel phases.

X-ray diffraction analysis was performed to determine whether there were any differences in crystallinity between the varieties of cellulose and how crystallinity compared between the raw powder and hydrogel phases. The degree of crystallinity ($I_c=1-(I_{min}/I_{max})$) was calculated according to Buschle-Diller and Zeronian, *J Appl Polym Sci,* 45, 967 (1992). The hydrogels are less crystalline than the raw powders (FIG. 5).

The ratio of cellulose I to cellulose II was also investigated according to the method of Gindl and Keckes, *Polymer* 46, 10221-10225 (2005). The ratio of cellulose I/II is significantly lower in the hydrogel phase, and bacterial cellulose has a much greater cellulose I/II ratio in the raw phase than the other varieties. The results are shown in Table 2, below.

TABLE 2

| Type | Index of Crystallinity | | Cellulose I/II | |
|---|---|---|---|---|
| | Raw | Gel | Raw | Gel |
| Avicel 101 | 1.029 | 0.861 | 5.423 | 1.337 |
| Avicel 102 | 1.017 | 0.809 | 5.692 | 2.169 |
| Avicel 105 | 1.015 | 0.868 | 3.761 | 2.467 |
| Avicel 200 | 1.022 | 0.753 | 5.117 | 1.230 |
| Aldrich 310697 | 1.032 | 0.850 | 5.732 | 1.175 |
| Aldrich 435236 | 1.032 | 0.911 | 5.244 | 1.335 |
| Bacterial | 1.021 | 0.602 | 10.347 | 1.262 |

The water content of various cellulose hydrogels was determined by thermal gravimetric analysis.

Figure 3A:
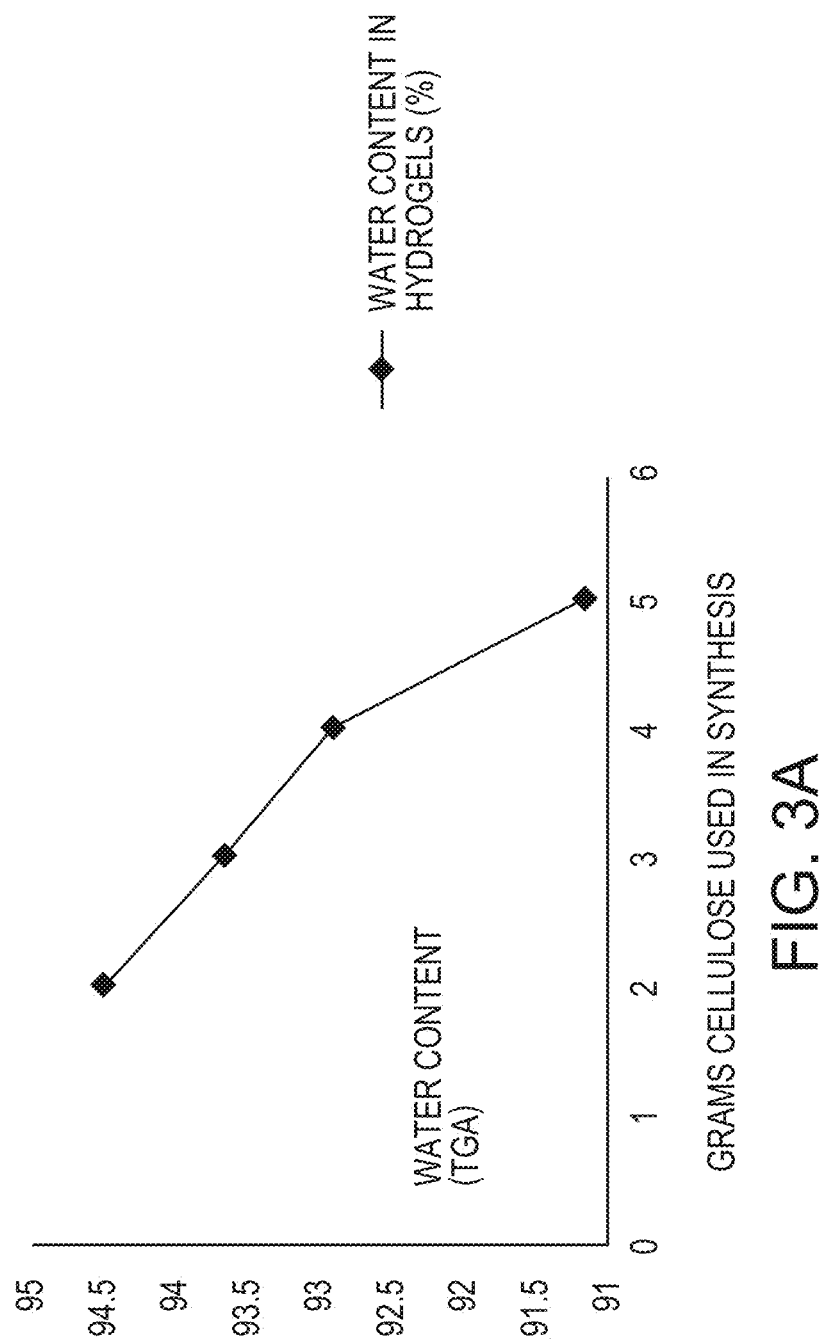
FIG. 3 shows thermogravimetric analysis (TGA) of various cellulose hydrogels. (A) shows the water content of wet Avicel 101 gels as a function of grams of cellulose (per 100 ml of solvent) used in synthesis. (B) shows TGA analysis of an Avicel 101 hydrogel (made using 5 grams of cellulose per 100 ml solvent).
Figure 3B:
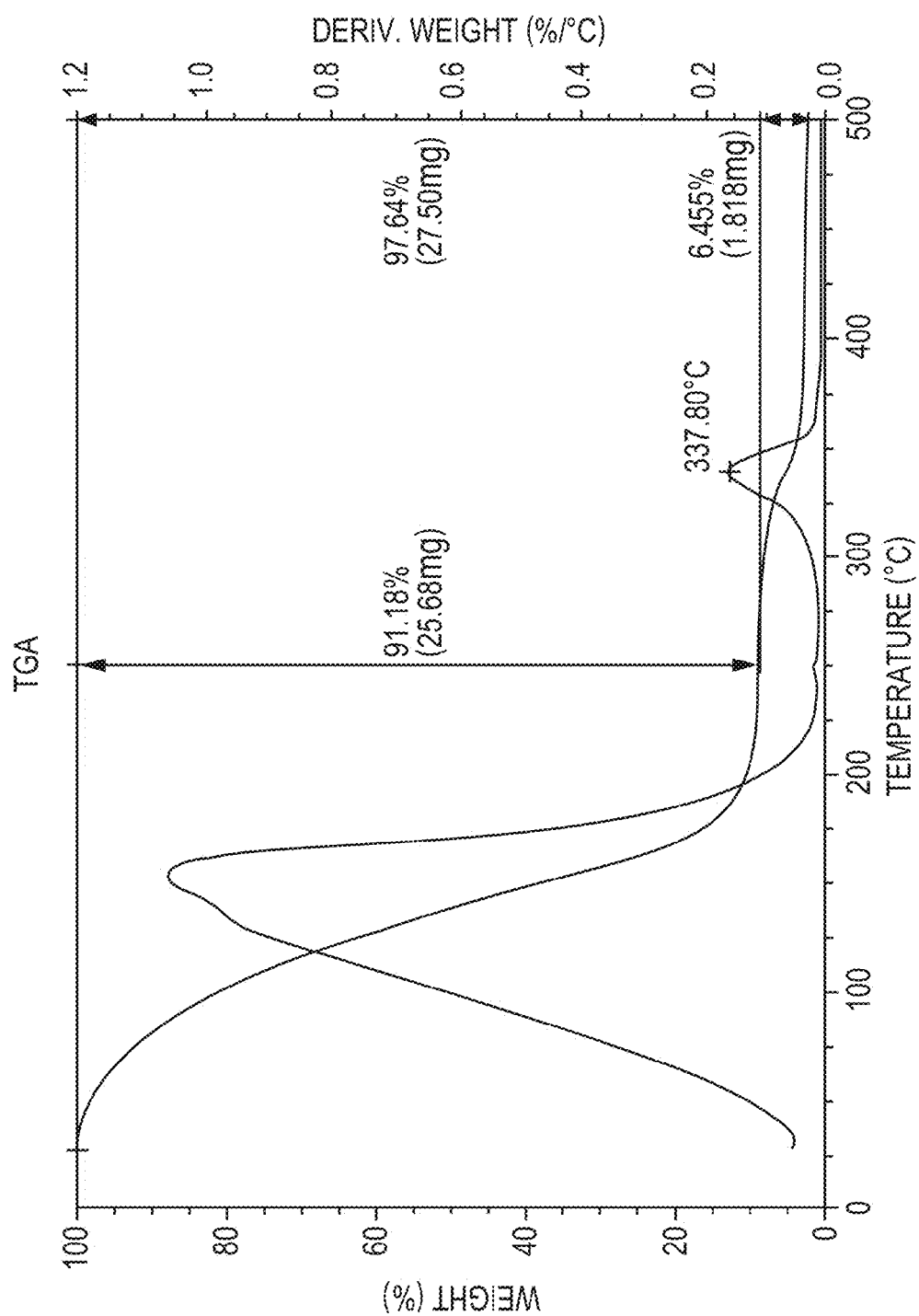
Figure 14A:
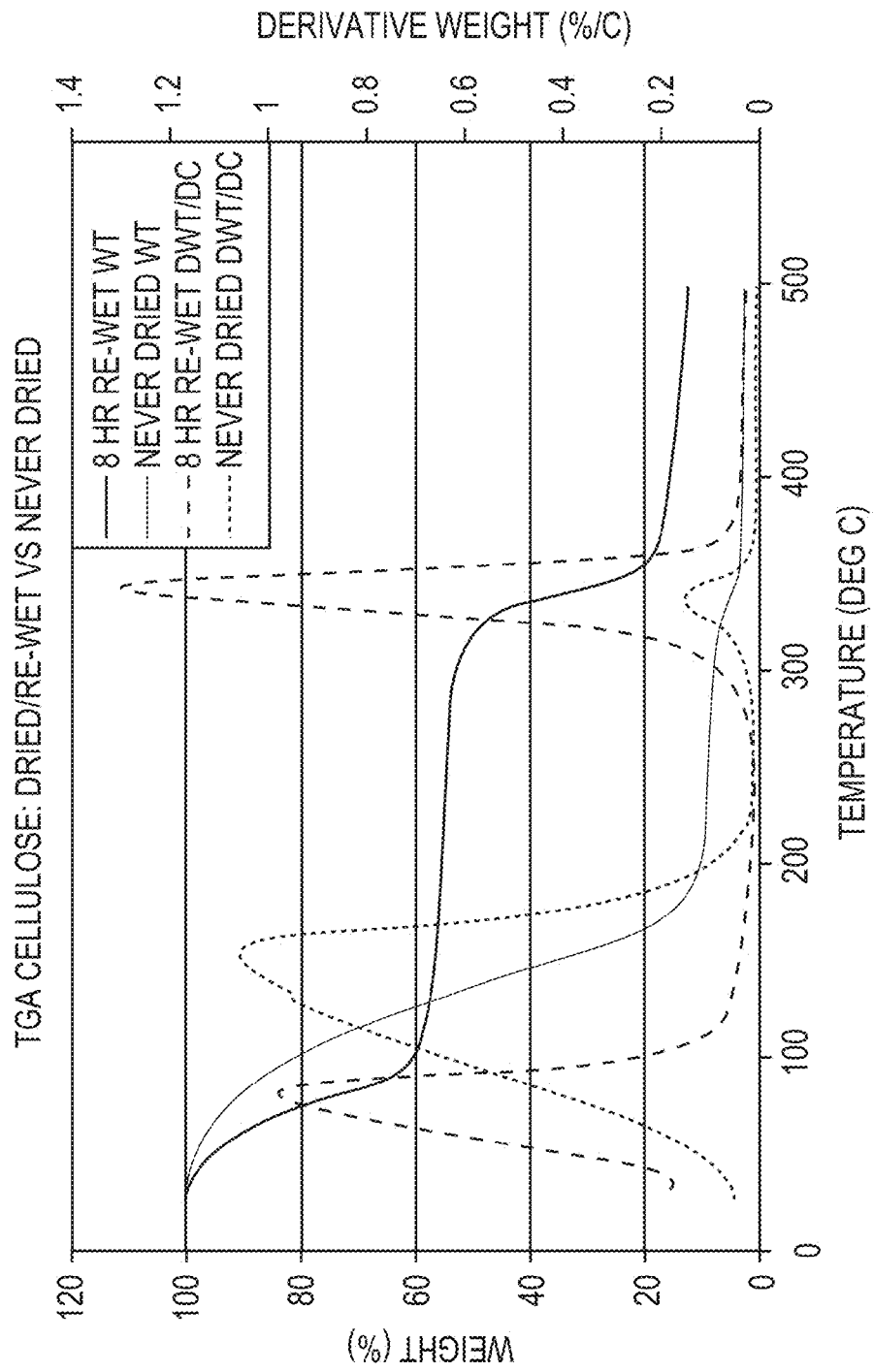
FIG. 14 (A) shows TGA analysis of dried, re-wet and wet (never dried) hydrogels. (B) shows water content of rehydrated gels as a function of rehydration time.
Figure 14B:
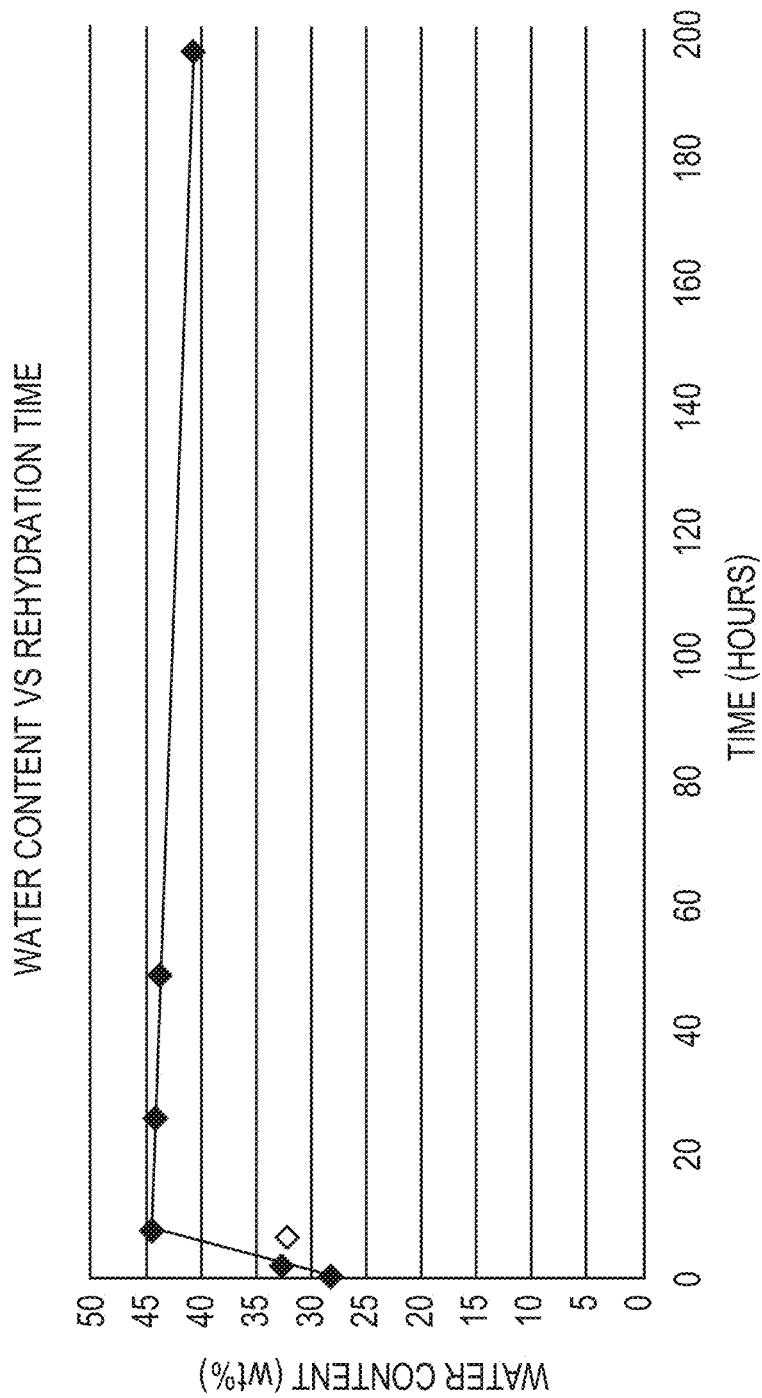
Figure 15:
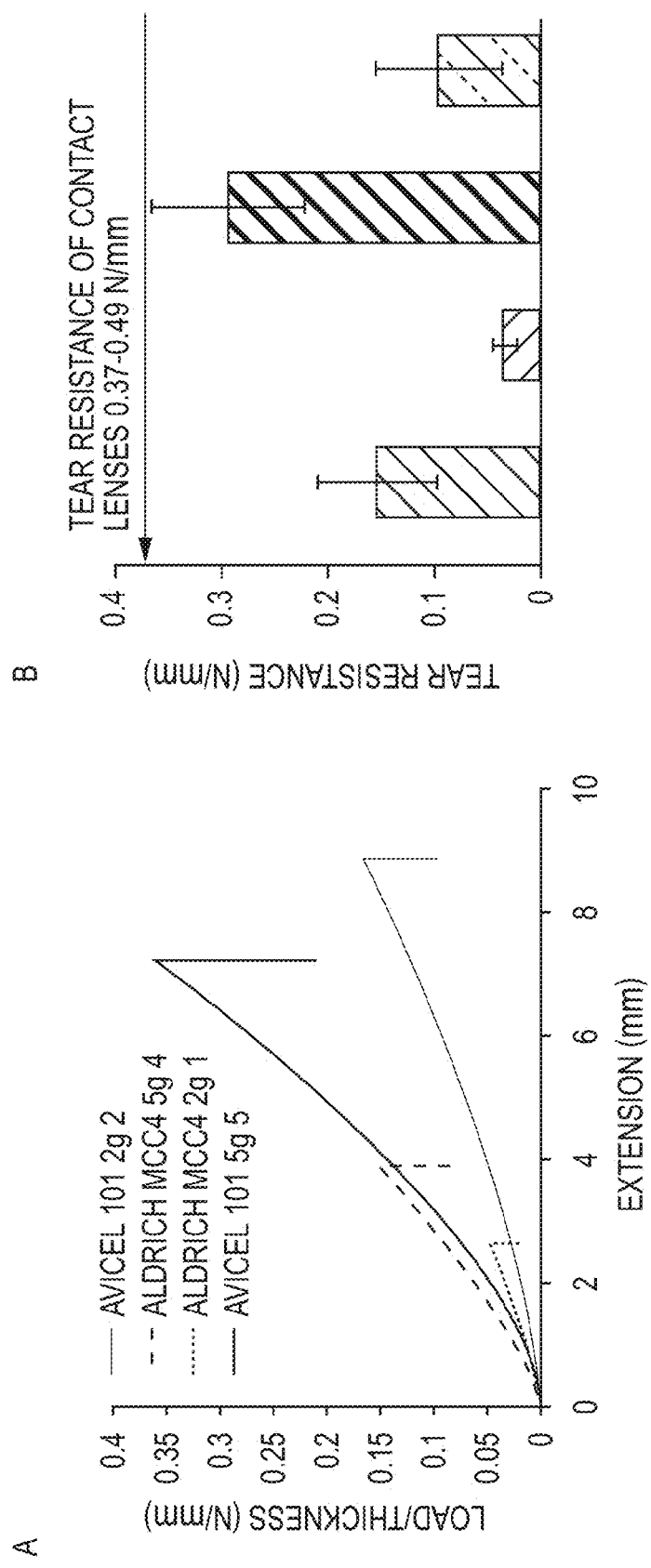
FIGS. 15A-B show tear resistance data for wet cellulose hydrogels.
Figure 16:
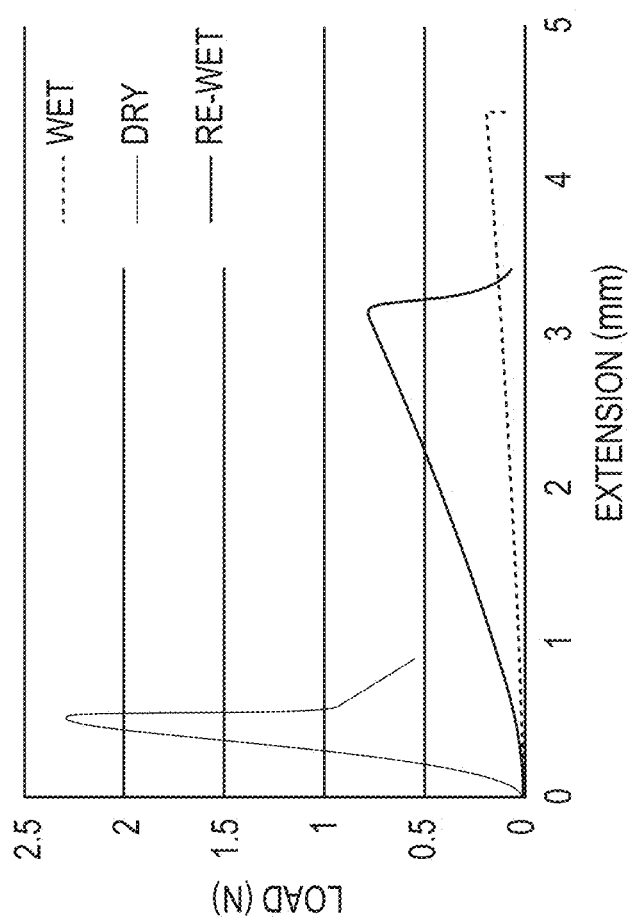
FIG. 16 shows tear resistance data comparisons for wet, dry and re-wet cellulose hydrogels (Avicel 101; made from 2 grams of cellulose in 100 ml of solvent).

Cellulose hydrogels prepared under different concentrations (2, 3, 4 and 5 g) were analyzed by TA instrument Q5000 Thermal Gravimetric Analyzer (TGA). All samples were heated from RT to 500 C at 20 C/min under N2 purge. During the test, sample weight change versus temperature was recorded. Derivatives of wt with regard to temperature (dWt/dT) was used to probe the peak temperature for each thermal transition. The mass lost during the temperature increase reflected the water content. As shown in FIG. 3, the range of water content obtained for the various wet hydrogels was about 91-95%. TGA analysis comparing dried/re-wet and never dried hydrogels is shown in FIG. 14.

Figure 6:
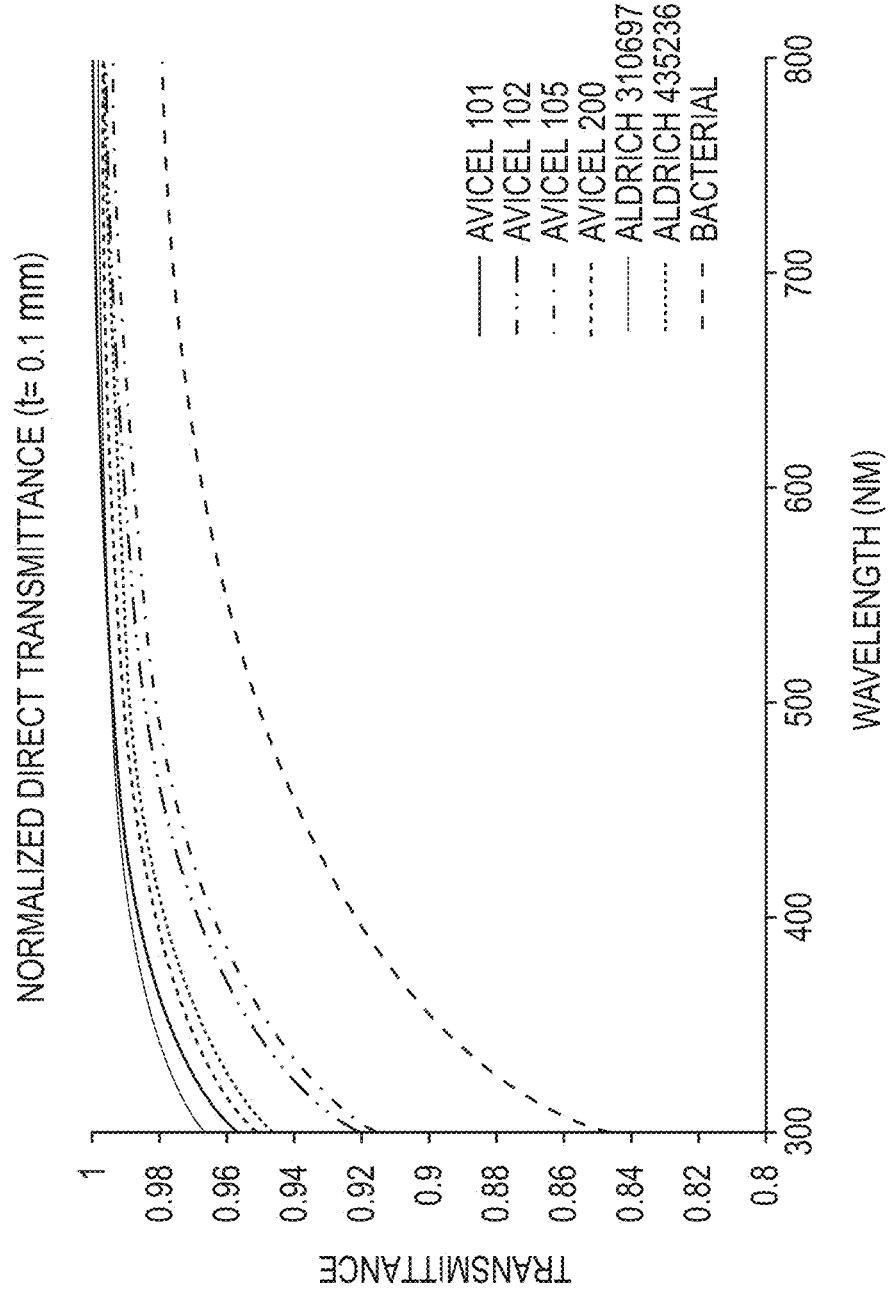
FIG. 6 shows transparency and refractive index data for 100 micron thick cellulose hydrogels.
Figure 7:
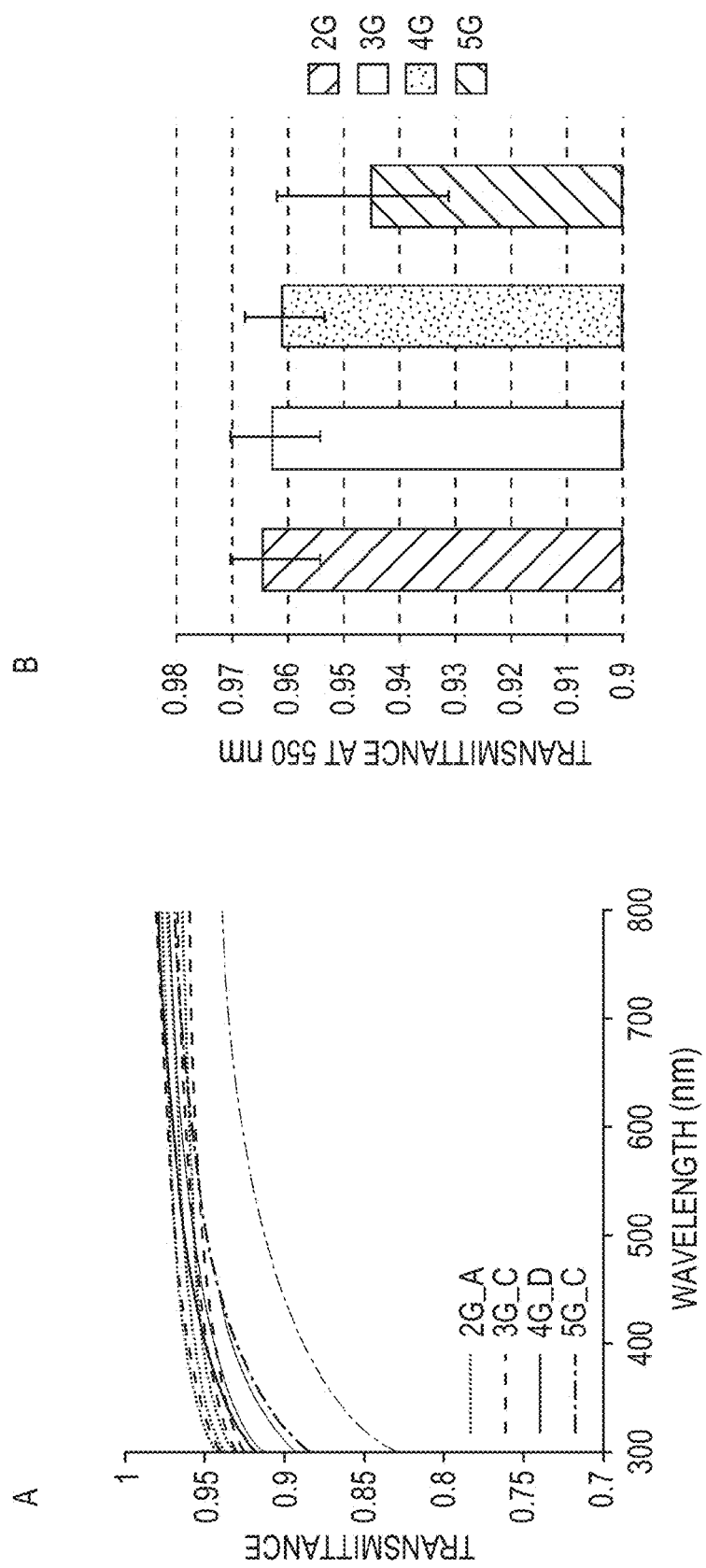
FIGS. 7A-B show the effects of cellulose concentration of the cellulose hydrogels on transparency.

The transparency of 100 micron thick cellulose hydrogels was also determined. Percent transmittance values were generated at a wavelength of 550 nm. The transparency of all cellulose hydrogels exceeded 95% in the visible range. The results are shown in FIG. 6.

The refractive index of the cellulose hydrogels was measured. The results are shown in Table 3, along with a comparison with various commercially available contact lenses.

TABLE 3

| Material | N |
|---|---|
| Avicel 101 | 1.3405 |
| Avicel 102 | 1.3420 |
| Aldrich 310697 | 1.3405 |
| Aldrich 435236 | 1.3402 |
| Avicel 105 | 1.3415 |
| Avicel 200 | 1.3435 |
| Soflens (Bausch & Lomb) | 1.430 |
| Hoya Soft (Hoya) | 1.450 |
| O$_2$ (Menicon) | 1.481 |
| Snoflex 50 (Smith & Nephew) | 1.410 |
| Gelflex 75 (W.A.C.L.M.) | 1.376 |
| Parabolar (Wohik) | 1.493 |

Example 2

Mechanical Properties of Cellulose Hydrogels

1. Tear Strength

Figure 17:
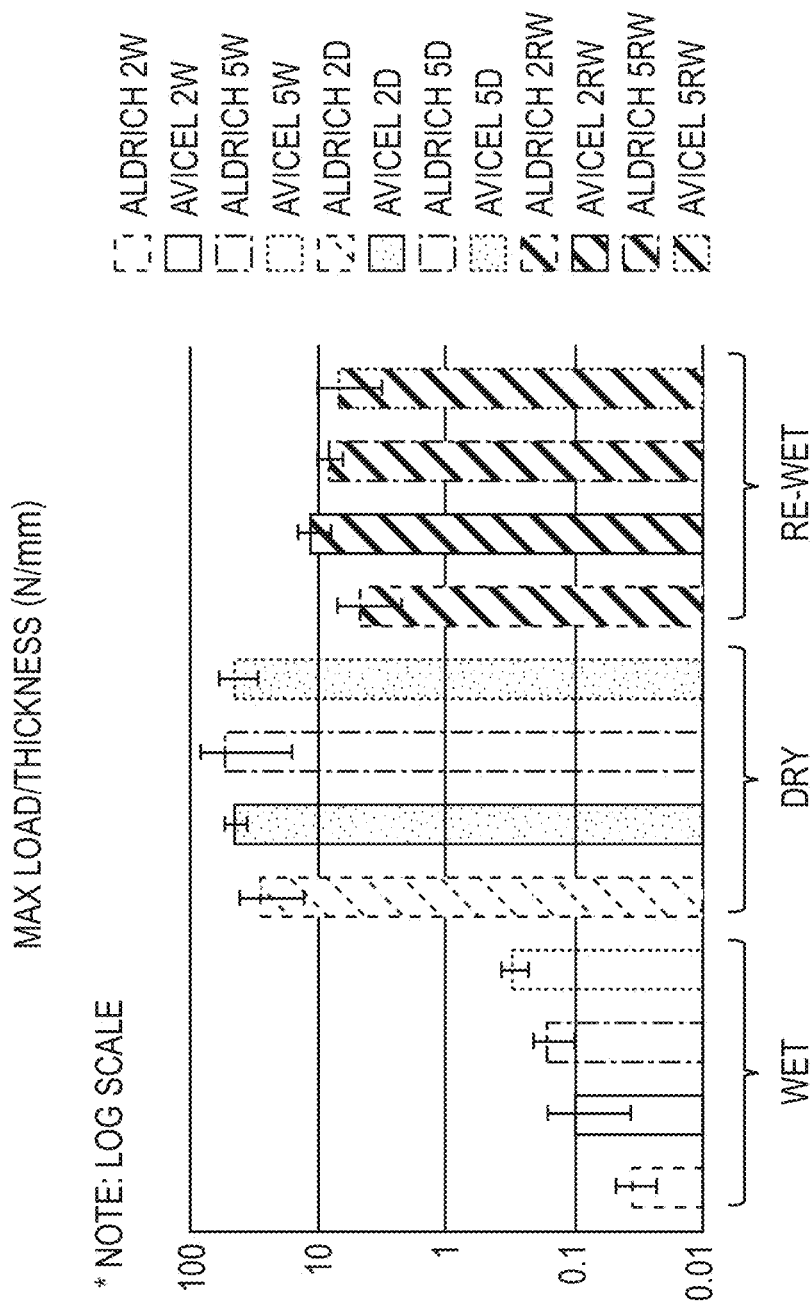
FIG. 17 shows tear strength of wet (w), dry (d) and re-wet (rw) cellulose hydrogels at 2 and 5 gram concentrations (Avicel 101 and Aldrich 4).

The tear strength of cellulose hydrogels in three different states (hydrated, dehydrated, and rehydrated) was characterized. All samples were made to conform to the geometry stated in ASTM standard D 624-00, sample type C. Samples in the hydrated state were made by pouring the cellulose+LiCl/DMAc solution into a mold with the appropriate sample geometry. Cheesecloth was placed in the ends of the mold before pouring to assist in gripping the hydrated gels during testing. Hydrated samples were allowed to gel overnight, washed in running tap water for 2-4 hours, soaked in tap water with frequent water exchange for 24-48 hours, and stored in tap water. Sheets of cellulose hydrogel were made by pouring the cellulose LiCl/DMAc solution onto a glass plate and allowing to gel overnight. Sheets were dehydrated between glass plates lined with Teflon film in an oven above 100° C. for approximately 5 hours. The sheets were then rehydrated in tap water for several hours. Samples were cut from rehydrated sheets by hand and either returned to water (rehydrated) or allowed to air dry (dehydrated). The thickness of all samples was measured prior to testing in three locations near the site of tearing (at the apex, above and below the apex) and the three values were averaged to obtain the sample thickness. All samples were tested using a 500N capacity tabletop mechanical testing system (#5942R4910, Instron) with a 5N maximum static load cell (#102608, Instron). Pneumatic side action grips were used to secure the samples (#2712-019, Instron). Samples were tested with a constant extension rate of 2 mm/min until failure. The tear strength was calculated as the force at failure divided by the average thickness (N/mm). Two different cellulose materials (Avicel 101 and Aldrich 4) and two different concentrations (2 g and 5 g) were characterized and compared in each state (hydrated, dehydrated, and rehydrated). See FIG. 17. Tear strength of typical contact lenses is 0.37-0.49 N/mm.

2. Suturability Characterization

Methods

Figure 23:
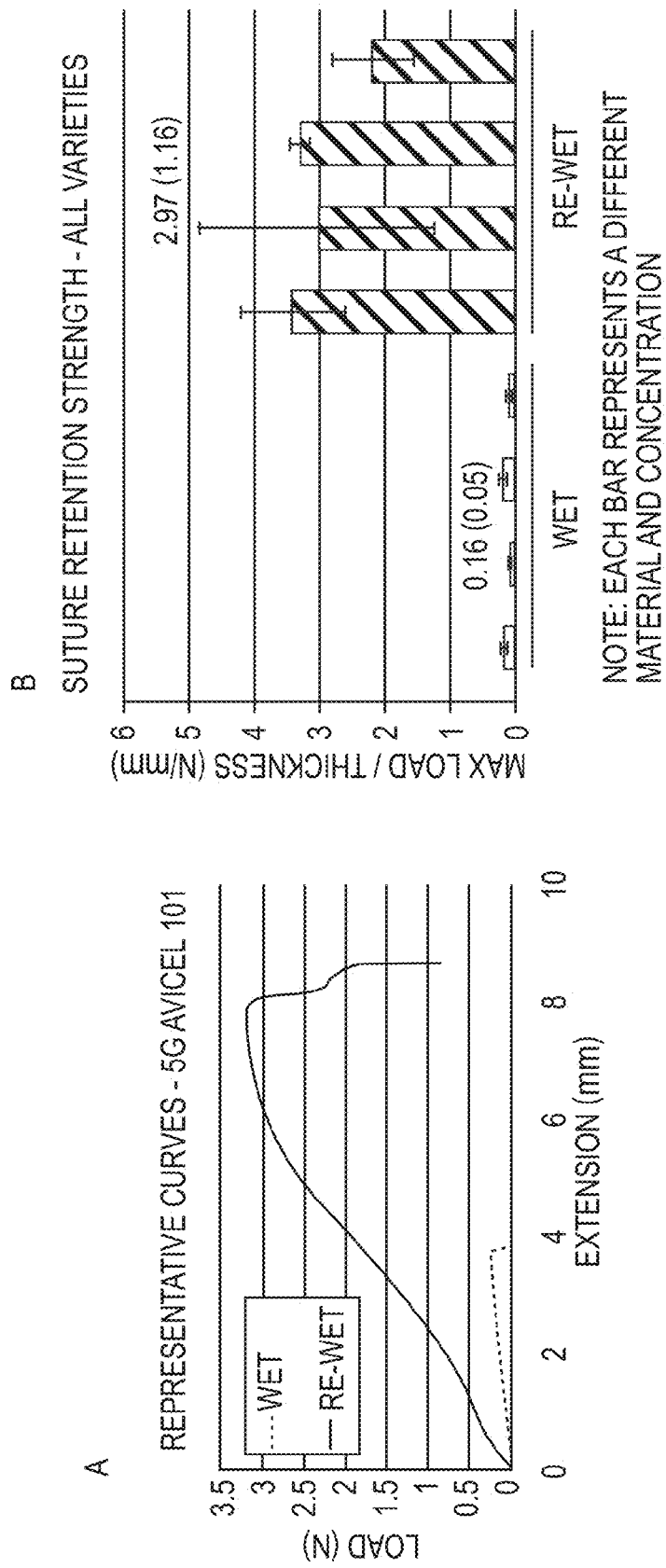
FIG. 23 shows suture retention strength data for wet and re-wet hydrogels. (A) shows a plot of load (N) versus extension (mm) for a wet and re-wet Avicel 101 hydrogel (5 grams of cellulose per 100 ml of solvent). (B) shows a graph of suture retention strength for various wet and re-wet hydrogels.

The suture retention strength of cellulose hydrogels was characterized as a measure of their surgical feasibility. Cellulose hydrogels in three states (hydrated, dehydrated, and rehydrated) were characterized. Samples were cut from cellulose sheets as described above. Samples were cut in rectangles 2 cm×4 cm. The testing procedure described by Trowbridge et al. was modified for use in this study (Trowbridge, E. A., Lawford, P. V., and Crofts, C. E. Pericardial heterografts: a comparative study of suture pull-out and tissue strength. *J. Biomed. Eng.,* 11 (1989) 311-14). All samples were tested using a 500N capacity tabletop mechanical testing system (#5942R4910, Instron) with a 5N maximum static load cell (#102608, Instron). Pneumatic side action grips were used to secure the samples (#2712-019, Instron). Before testing, the thickness of each sample was measured at three points along one of the short edges (designated the top edge). The sample was then secured in the stationary (bottom) pneumatic grip, with half of the sample inside of the grip, and a suture was threaded through the sample once in the center of the sample with a bite size of 2 mm from the top edge. Ethicon Ethilon 10-0 ophthalmic sutures were used (7756G and 7711G, Ethicon, Inc.). Both ends of the suture were secured in the movable (top) pneumatic grip. FIG. 22 shows a diagram of the sample setup, and FIG. 23 shows results of the testing. Samples were tested with a constant extension rate of 10 mm/min until failure. The suture retention strength was taken to be the force at failure divided by the average sample thickness (N/mm).

3. Puncture Testing

Puncture strength was measured according to the method described by Radebaugh et al. (Radebaugh et al., *Int J Pharmaceutics* 45, 1988, p 39-46). A schematic of their setup is shown in FIG. 18A, and the fixture used for testing is shown in FIG. 18B. Rather than fixing the hydrogel between two plates using screws, which can pinch or tear the gel, the hydrogels were secured to the fixture with cyanoacrylate. A hemispherical probe with a 2 mm diameter was lowered onto the gel at a rate of 2 or 10 mm/min.

Elongation to puncture was measured as $$\varepsilon_p(\%) = \frac{([R]^2 + [D]^2)^{1/2} - R}{R} \cdot 100,$$

puncture strength as $$\sigma_{puncture}(\text{kPa}) = \frac{F}{A_{cs}},$$

and energy to puncture as $$\Delta E_p(\text{J/cm}^3) = \frac{\int F \cdot D}{V_c},$$

where F=force and all other variables are defined as in FIG. 18C.

4. Tensile Strength

Figure 8:
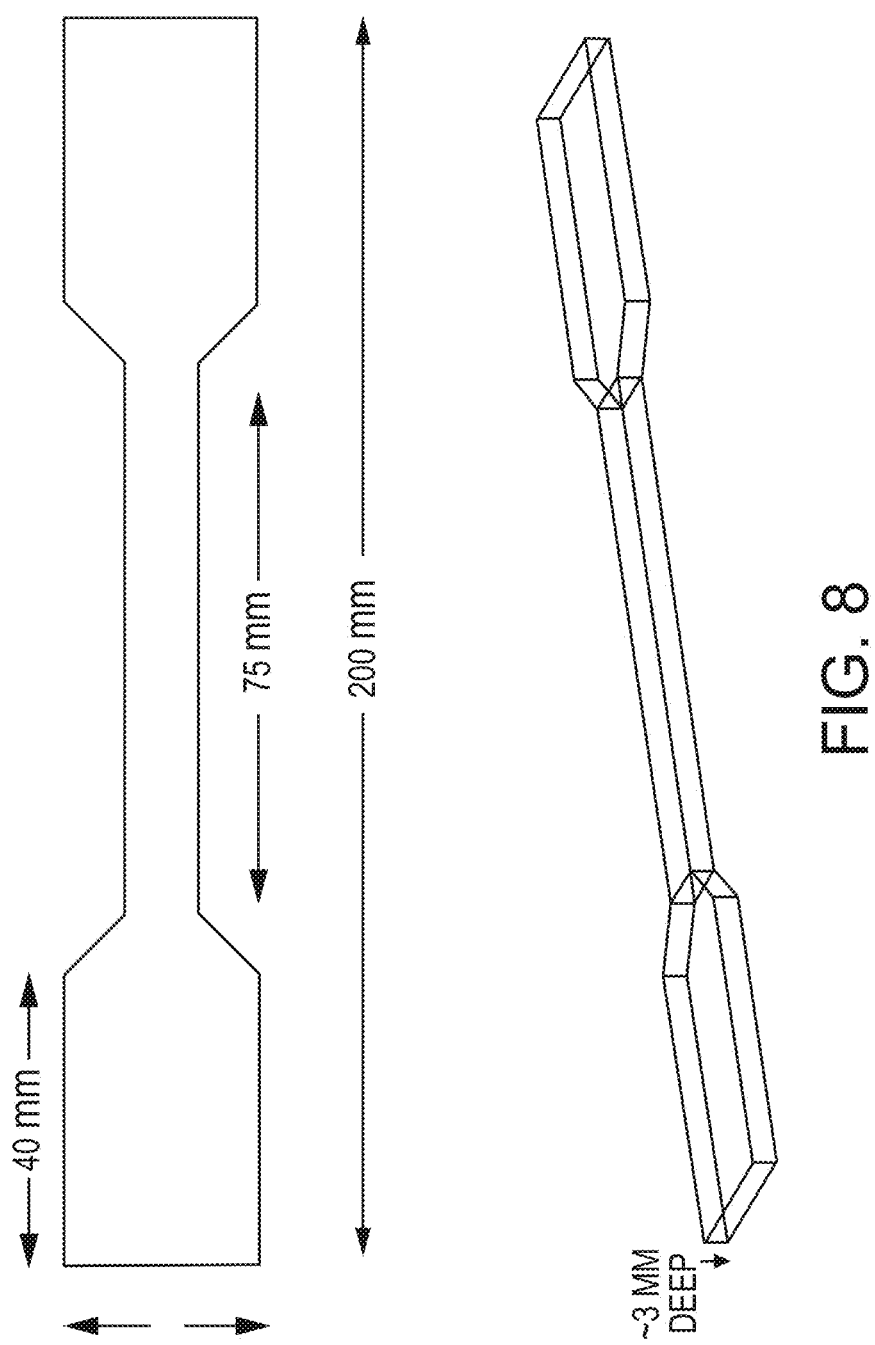
FIG. 8 shows dogbone mold dimensions used for tensile testing wet gels.
Figure 9:
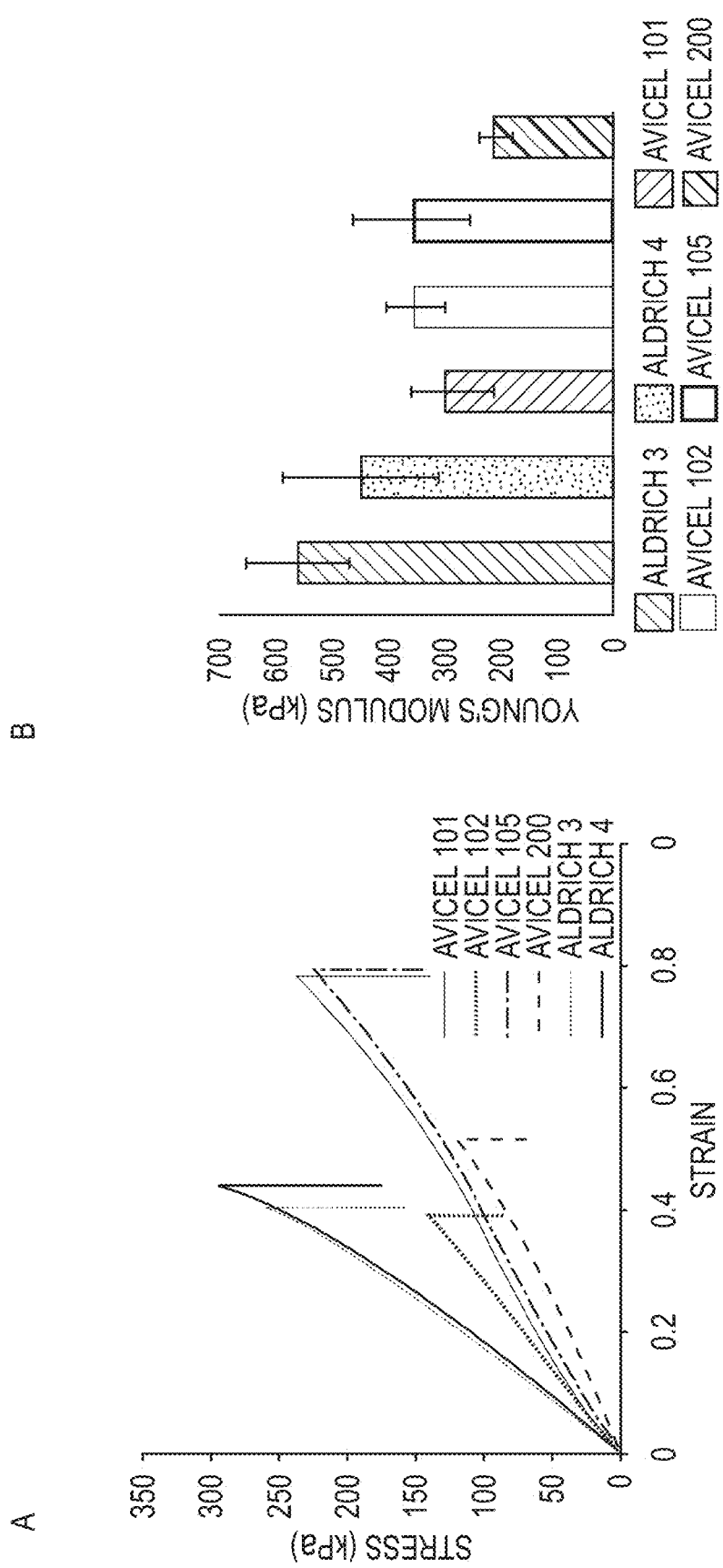
FIGS. 9A-B show tensile behavior and Young's Modulus data for wet cellulose hydrogels.
Figure 10:
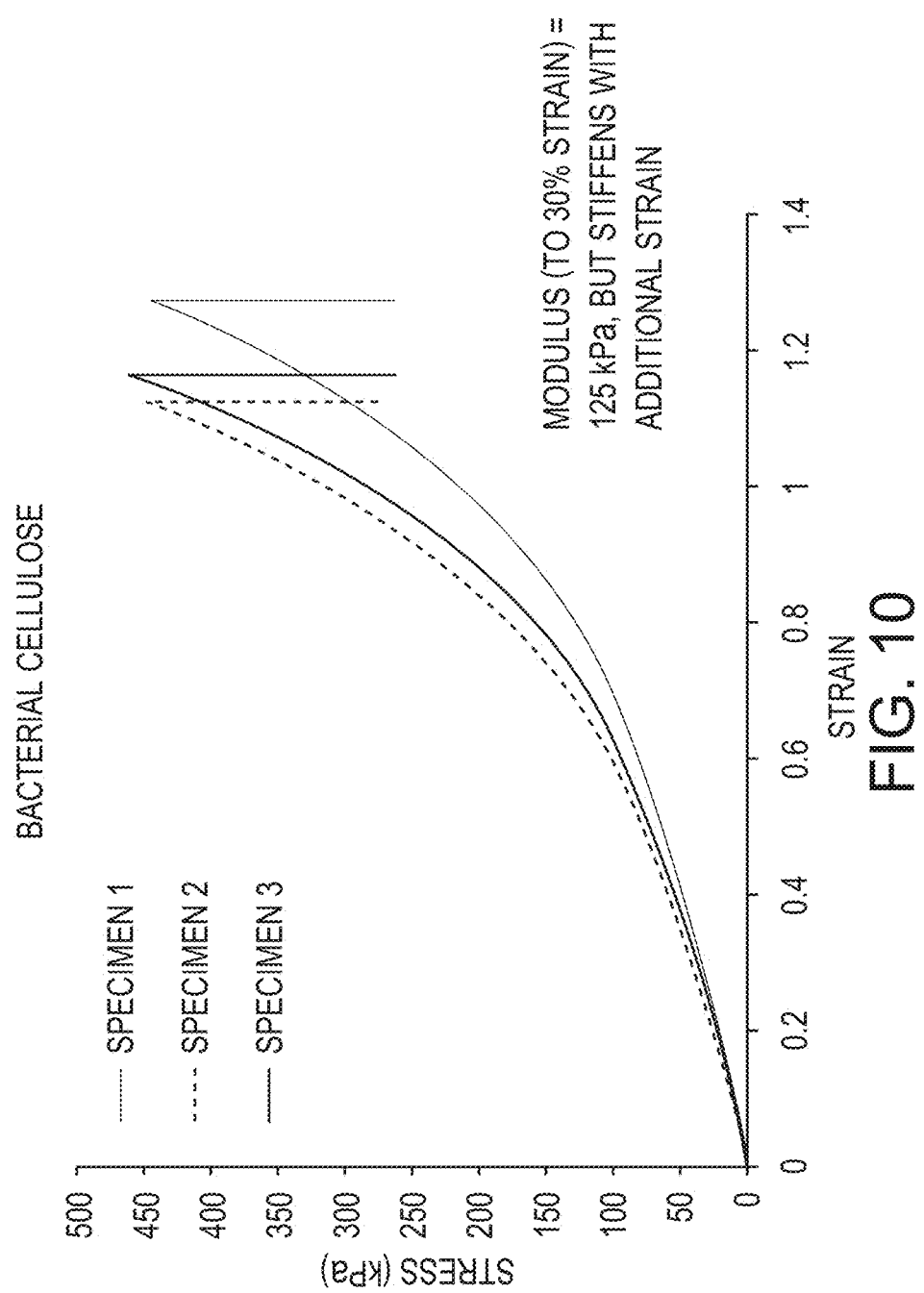
FIG. 10 shows tensile behavior for wet bacterial cellulose hydrogels (500 mg in 50 mL LiCl/DMAc).
Figure 11C:
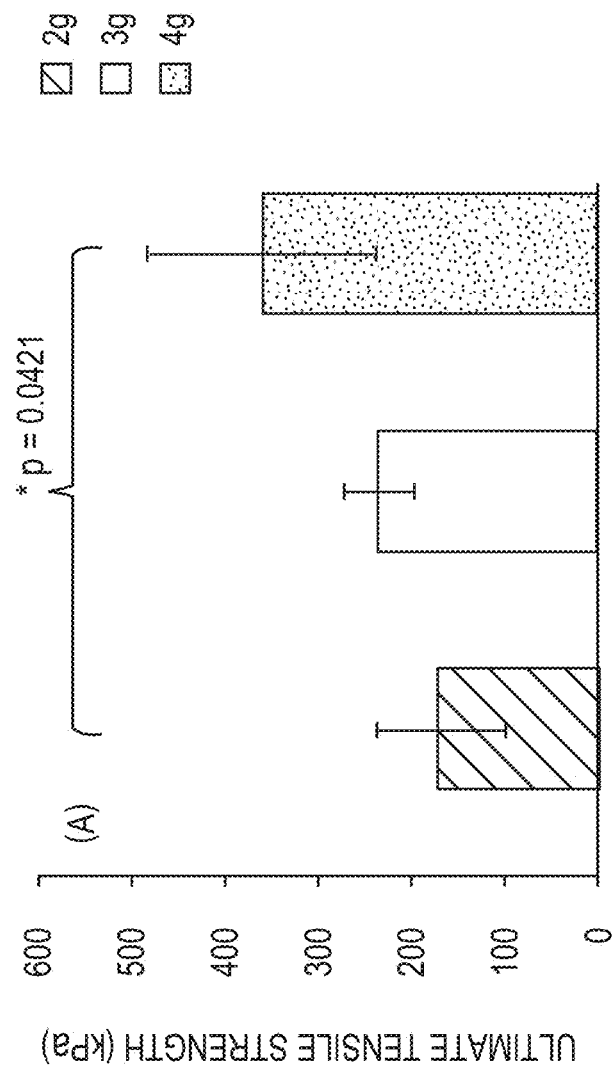
Figure 12:
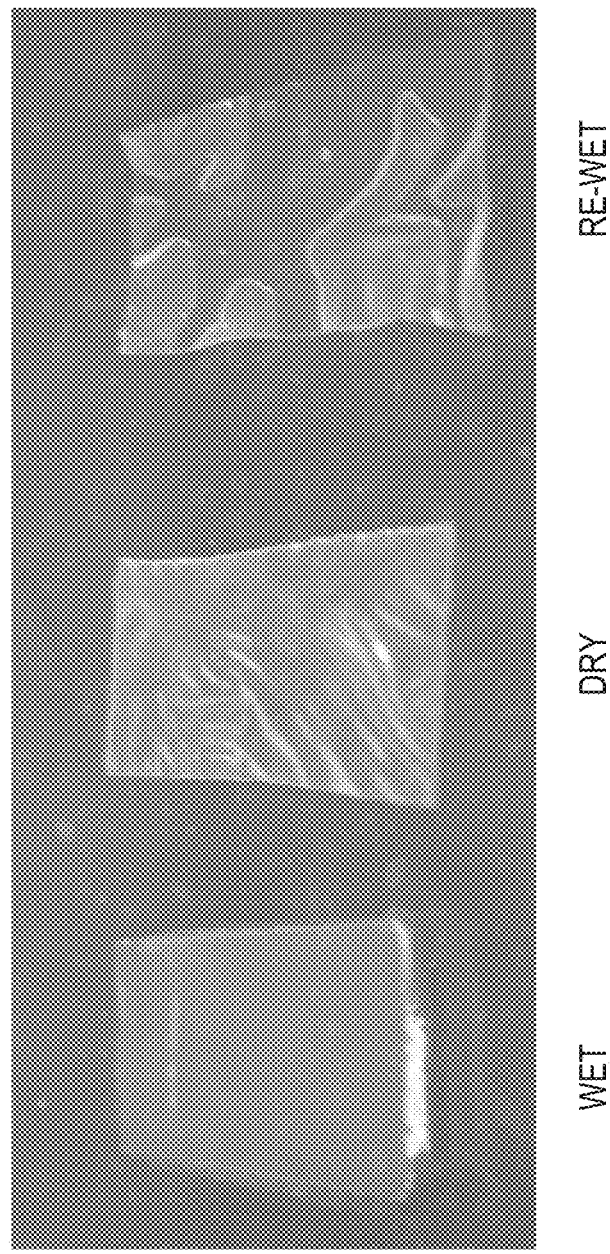
FIG. 12 shows images of wet, dry, and re-wet gels.
Figure 13:
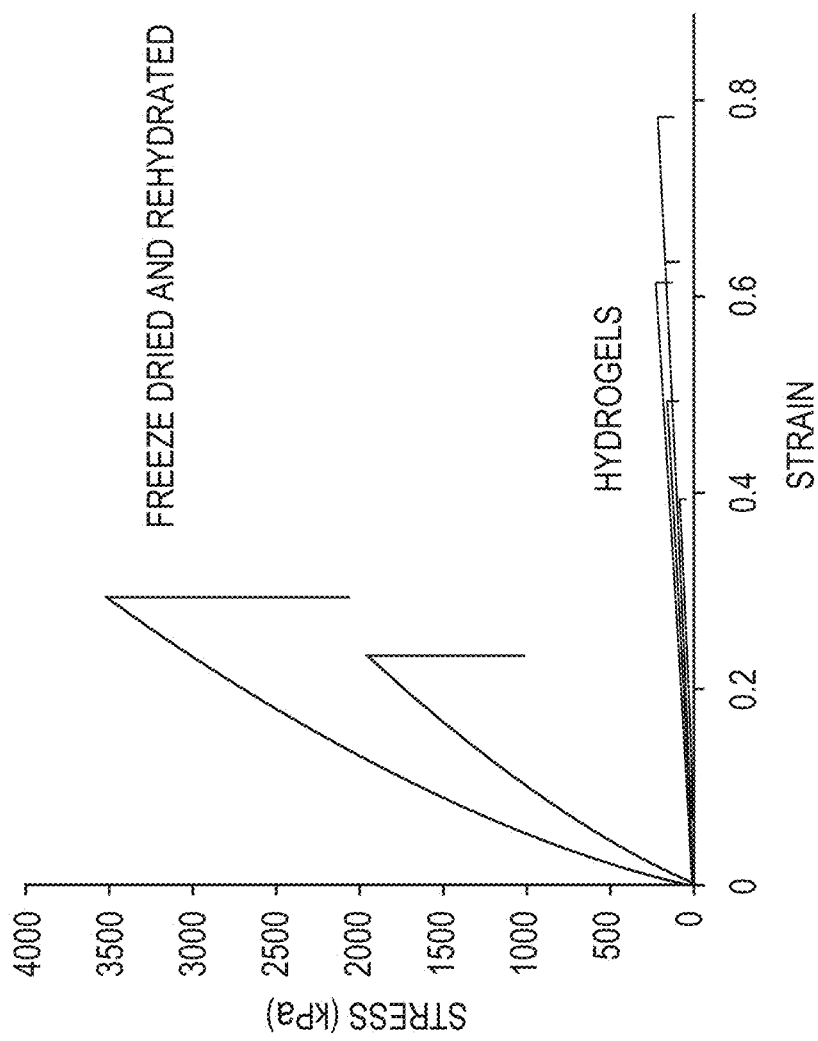
FIG. 13 shows results demonstrating increased tensile strength of cellulose hydrogels after a drying and rehydration step (re-wet cellulose hydrogels).

The tensile strength of the prepared ("wet") cellulose hydrogels was measured using a 500N capacity tabletop mechanical testing system (#5942R4910, Instron) with a 5N maximum static load cell (#102608, Instron). Pneumatic side action grips were used to secure the samples (#2712-019, Instron). A constant extension rate of 2 mm/min until failure was used and the tensile strength was calculated from the stress vs. strain data plots. Samples were prepared by pouring the cellulose LiCl/DMAc solution into a "dogbone" mold as shown in FIG. 8. Cheesecloth was placed in both ends of the mold before pouring to assist in gripping the gels during testing. Samples were allowed to gel overnight, washed in running tap water for 2-4 hours, soaked in tap water with frequent water exchange for 24-48 hours, and stored in tap water until use. Prior to testing, the width and thickness of the hydrogel at the center of the dogbone, as well as the gauge length were measured for all samples. Initially, six different cellulose materials (Avicel 101, Avicel 102, Avicel 105, Avicel 200, Aldrich 310697, and Aldrich 435236) at a concentration of 2% (w/v dry cellulose to LiCl/DMAc solution) were characterized. Avicel 101 and Aldrich 435236 were further characterized at varying concentrations (2%-5%) and varying stir times in the LiCl/DMAc solution (5-30 minutes).

Example 3

Transparency Properties of the Cellulose Hydrogels

The transmittance of the cellulose hydrogels was measured in the range of wavelengths from 250 to 800 nm using a Perkin-Elmer Lambda 9500 series UV-visible spectrophotometer. As transmittance is dependent upon thickness, the thickness of each sample was measured with calipers prior to loading the sample in the spectrophotometer. Transmittance values were then normalized to a thickness of 100 μm according to $$F_{T\text{-}corr}(\lambda, t_2) = [e^{-\sigma_t(\lambda)t_1}]^{\frac{t_2}{t_1}} = [F_{T\text{-}corr}(\lambda, t_1)]^{\frac{t_2}{t_1}},$$

where $t_1$=actual specimen thickness, $t_2$=thickness to which transmittance measurements were normalized.

Example 4

Oxygen Permeability Properties of Cellulose Hydrogels

Oxygen permeability of the cellulose and collagen materials can be determined using a polarographic method. This method directly measures the number of oxygen molecules diffusing though the material by measuring an electric current generated by the reduction of oxygen at the cathode. In a single polarographic determination, for example, four samples of the same material with different thicknesses can be used. This results in a linear relation between the inverse of oxygen transmissibility and the sample thickness. The sample is placed onto the surface of the electrode (cell), fixed gently by pressing toward the electrode and retained with an o-ring. Then, a saline solution (0.9% NaCl, pH 7.4) is poured into the reservoir on the material, and the system is ready for measuring the electric current. The system is held in a humidity chamber at 35° C. with high humidity (the polarographic cell and the saline solution are in the humidity chamber prior the measurement to achieve equilibrium conditions). The saline solution and the sample are saturated with atmospheric oxygen. To remove the oxygen, nitrogen gas is bubbled through a glass frit while monitoring current, until the current decreases to nearly zero. Once most of the oxygen is removed, air is bubbled into the solution, and the increase in electric current is observed as the oxygen molecules react with the cathode. The current is recorded until it reaches a stationary state.

Example 5

Molded Contact Lens from Cellulose Sheet

Figure 24:
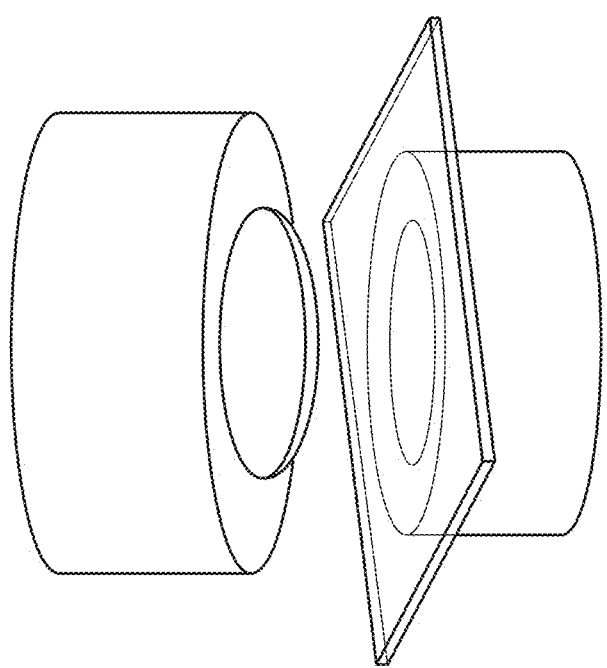
FIG. 24 shows a method of making a molded contact lens from a cellulose sheet.

Two drops of PBS buffer are added to the cavity in the bottom half of a contact lens mold, an embodiment of which is illustrated in FIG. 24. The cavity is covered with a 2 cm×2 cm sheet of cellulose (which can be substituted with a cellulose hydrogel of the invention). 1-2 more drops of PBS buffer are placed on top of the cellulose. The top half of the contact lens mold is then put over the bottom half. A spring clamp is then applied to keep the halves together. The mold is then placed in a humidity chamber at 40% relative humidity and 40° C. After 48 hours, the clamp is removed and the mold is opened. The excess cellulose and gel is then trimmed and removed as necessary. The lens is then stored in PBS buffer.

All references, including publications, patent applications, and patents, cited herein are hereby incorporated by reference to the same extent as if each reference were individually and specifically indicated to be incorporated by reference and were set forth in its entirety herein.

What is claimed is:

1. A re-wet cellulose hydrogel wherein the hydrogel comprises a cellulose content of about 55% by weight and one or more properties selected from the group consisting of: a tensile strength of from about 1000 kPa to about 5000 kPa; a tear strength of from about 3.0 N/mm to about 12 N/mm; a strain to failure of from about 20% to about 40%; a suture retention strength of from about 1.0 N/mm to about 7.0 N/mm; a transparency that exceeds 85% at 550 nm at 100 microns thickness; Young's modulus of from about 4000 kPa to about 15000 kPa; and a puncture resistance of from about 3 MPa to about 5 MPa,
wherein the hydrogel is in the shape of a contact lens, and
wherein the cellulose is from a source selected from the group consisting of plant, wood pulp, cotton pulp, microbial, and combinations thereof.

2. The hydrogel of claim 1, wherein the hydrogel comprises one or more cellulose fiber layers.

3. The hydrogel of claim 1, wherein the transparency of the hydrogel is at least 95% at 550 nm.

4. A re-wet cellulose hydrogel wherein the hydrogel comprises one or more properties selected from the group consisting of: a cellulose content of from about 40% to about 65% by weight; a tensile strength of from about 1000 kPa to about 5000 kPa; a tear strength of from about 3.0 N/mm to about 12 N/mm; a strain to failure of from about 20% to about 40%; a suture retention strength of from about 1.0 N/mm to about 7.0 N/mm; a transparency that exceeds 85% at 550 nm at 100 microns thickness; Young's modulus of from about 4000 kPa to about 15000 kPa; and a puncture resistance of from about 3 MPa to about 5 MPa, the hydrogel further comprising cellulose starting material having a density of about 0.20-0.40 g/cm$^3$ and a moisture content of about 2-6% by weight,
wherein the hydrogel is in the shape of a contact lens.

5. The hydrogel of claim 1, further comprising one or more synthetic polymers selected from the group consisting of hydroxyethylmethacrylate (HEMA), poly(hydroxyethyl methacrylate) (PHEMA), polyacrylamide, polyethylene glycol (PEG), polyethyleneoxide (PEO), polyacrylonitrile (PAN), polyvinyl alcohol (PVA), poly(vinyl pyrrolidone) (PVP) and silicones.

6. The hydrogel of claim 1, wherein the hydrogel has a thickness of from about 50 to about 250 microns.

7. The hydrogel of claim 1, wherein the hydrogel has a refractive index of from about 1.30 to about 1.50.

8. The hydrogel of claim 1, wherein the hydrogel has a tear strength of from about 3.0 N/mm to about 12 N/mm.

9. A re-wet cellulose hydrogel wherein the hydrogel comprises one or more properties selected from the group consisting of: a cellulose content of from about 40% to about 65% by weight; a tensile strength of from about 1000 kPa to about 5000 kPa; a tear strength of from about 3.0 N/mm to about 12 N/mm; a strain to failure of from about 20% to about 40%; a suture retention strength of from about 1.0 N/mm to about 7.0 N/mm; a transparency that exceeds 85% at 550 nm at 100 microns thickness; Young's modulus of from about 4000 kPa to about 15000 kPa; and a puncture resistance of from about 3 MPa to about 5 MPa, the hydrogel, wherein the hydrogel is a composite comprising microcrystalline cellulose and bacterial cellulose.

10. The hydrogel of claim 1, wherein the hydrogel has a denaturation temperature of at least about 300° C.

11. A process for preparing a cellulose hydrogel comprising:
(i) contacting cellulose with a solvent to activate the cellulose, the cellulose comprising cellulose starting material having a density of about 0.20-0.40 g/cm$^3$ and a moisture content of about 2-6% by weight;
(ii) optionally removing the solvent from the activated cellulose;
(iii) substantially dissolving the activated cellulose to form a solution;
(iv) allowing the solution to gel; and
optionally (v) drying the gel and rehydrating the gel.

12. The process of claim 11, wherein the solution gels in a mold and is later removed and optionally washed.

13. The process of claim 11, wherein the solvent of (i) is selected from the group consisting of dimethylacetamide, water, methanol, acetone, ethanol and a combination of water and ethanol.

14. The process of claim 11, wherein the cellulose is substantially dissolved in a solvent selected from the group consisting of cupriethylenediamine (CED), cadmiumethylenediamine (Cadoxen), LiCl/dimethylacetamide (LiCl/DMAc), Ca(SCN)$_2$/water, 1-butyl-3-methylimidazolium chloride (BmimCl), NaOH/water, N-methyl-morpholine-N-oxide (NMMO)/water, and 1-allyl-3-methyllimidazolium chloride.

15. The process of claim 11, wherein the gel is dried by a process selected from the group consisting of freeze drying (lyophilization); drying in a hot press between two heated platens while applying an amount of pressure; a solvent exchange process; supercritical CO$_2$; air drying; and a combination thereof.

16. The process of claim 12, wherein the mold is a contact lens mold.

17. The process of claim 11, wherein the rehydrated hydrogel has a tensile strength of about 1250 kPa to about 3500 kPa.

18. The process of claim 17, wherein the rehydrated gel has a transparency of at least about 95% at 550 nm.

19. A contact lens comprising the rehydrated gel made according to the process of claim 15.

20. A wet cellulose hydrogel wherein the hydrogel comprises one or more properties selected from the group consisting of: a cellulose content of from about 2% to about 9% by weight; a tensile strength in the range of from about 50 kPa to about 600 kPa; a tear strength of from about 0.10 N/mm to about 0.60 N/mm; a strain to failure of from about 40% to about 80%; a suture retention strength of from about 0.05 N/mm to about 0.30 N/mm; a transparency that exceeds 85% at 550 nm; Young's modulus of from about 100 kPa to about 700 kPa; and a puncture resistance of from about 50 kPa to about 300 kPa, wherein the hydrogel is a composite comprising microcrystalline cellulose and bacterial cellulose.

* * * * *

UNITED STATES PATENT AND TRADEMARK OFFICE
CERTIFICATE OF CORRECTION

PATENT NO. : 8,871,016 B2  
APPLICATION NO. : 13/197116  
DATED : October 28, 2014  
INVENTOR(S) : Morgana M. Trexler et al.

Page 1 of 1

It is certified that error appears in the above-identified patent and that said Letters Patent is hereby corrected as shown below:

In the Specification

Column 1, Line 7, Statement of Governmental Interest, delete "X81XWH-09-2-0173" and insert therefor --W81XWH-09-2-0173--.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*